United States Patent
Kutaragi et al.

(10) Patent No.: US 6,683,847 B2
(45) Date of Patent: *Jan. 27, 2004

(54) RECORDING MEDIUM HOLDER FOR ACCOMMODATING RECORDING MEDIUM AND INFORMATION PROVIDING BODY ACCOMMODATING RECORDING MEDIUM

(75) Inventors: Ken Kutaragi, Tokyo (JP); Teiyu Goto, Tokyo (JP); Mariko Hino, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 09/779,126

(22) Filed: Feb. 7, 2001

(65) Prior Publication Data
US 2001/0021167 A1 Sep. 13, 2001

(30) Foreign Application Priority Data

| Feb. 10, 2000 | (JP) | ........................................ 2000-034263 |
| Jan. 9, 2001 | (JP) | ........................................ 2001-001221 |

(51) Int. Cl.$^7$ ................................................. G11B 3/70
(52) U.S. Cl. ........................................................ 369/291
(58) Field of Search ........................................ 369/291

(56) References Cited

U.S. PATENT DOCUMENTS

| 3,466,774 A | 9/1969 | Borresen ................... 206/232 |
| 4,009,781 A | 3/1977 | Agnew et al. ............ 206/307.1 |
| 4,108,307 A | 8/1978 | Feingold et al. ......... 206/307.1 |
| 4,566,590 A | 1/1986 | Manning et al. ......... 206/307.1 |
| 4,869,364 A | 9/1989 | Bray ........................ 206/307.1 |
| 4,993,552 A | 2/1991 | Bugbey et al. .......... 206/307.1 |
| 5,207,717 A | 5/1993 | Manning ................... 206/307.1 |
| 5,284,243 A | * 2/1994 | Gelardi et al. ........... 206/308.1 |
| 5,324,036 A | 6/1994 | Morrow .................... 312/223.3 |
| 5,515,967 A | 5/1996 | Fitzsimmons et al. ... 206/307.1 |
| 5,597,068 A | 1/1997 | Weisburn et al. ........ 206/307.1 |
| 5,653,335 A | 8/1997 | Bauer et al. ............. 206/307.1 |
| 5,788,068 A | 8/1998 | Fraser et al. ............. 206/307.1 |
| 5,899,327 A | 5/1999 | Sykes ....................... 206/307.1 |
| 5,915,548 A | 6/1999 | Sasaki ...................... 206/307.1 |

FOREIGN PATENT DOCUMENTS

| JP | 3-98788 | 10/1991 |
| JP | 5-112383 | 5/1993 |
| JP | 5-213387 A | 8/1993 |
| JP | 03004172 | 11/1994 |
| JP | 7-323158 A | 12/1995 |
| JP | 8-53180 | 2/1996 |
| JP | 3-025667 | 4/1996 |
| JP | 9-012074 A | 1/1997 |
| JP | 8-286905 | 2/1997 |
| JP | 11-179048 | 7/1999 |
| TW | 80110328 | 10/1980 |
| TW | 87215404 | 4/1999 ........... B65D/85/87 |

* cited by examiner

Primary Examiner—A. J. Heinz
Assistant Examiner—Mark Blouin
(74) Attorney, Agent, or Firm—Frommer Lawrence & Haug LLP; William S. Frommer; Hans R. Mahr

(57) ABSTRACT

A recording medium holder in which a recording medium and a recording device can be kept is supplied. The recording medium holder has an accommodating member (100) for accommodating the recording medium and the recording device, and an auxiliary accommodating member (700) in which a recording medium to be held can be accommodated. The accommodating member (100) has a first accommodating area (200) in which at least one recording medium to be held can be accommodated, and a second accommodating area (300) in which at least one recording device for recording data can be accommodated. The accommodating member (100) has a first member (110), a second member (120) and a link member (130) for linking the first and second members (110) and (120) to fabricate a folder-shaped structure. The auxiliary accommodating member (700) is detachably linked to the link member (130), and located between the first member (110) and the second member (120) when they are folded.

35 Claims, 16 Drawing Sheets

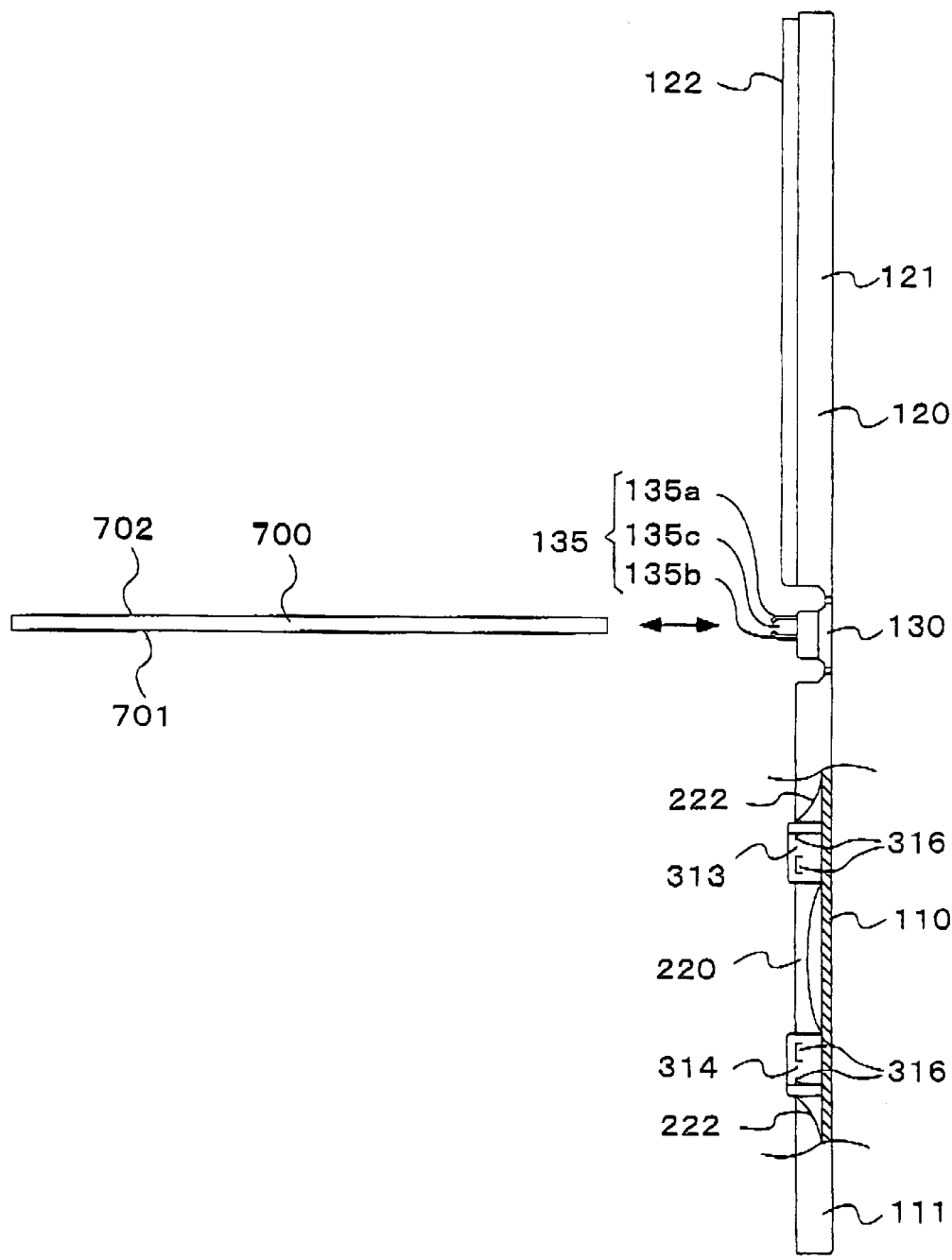

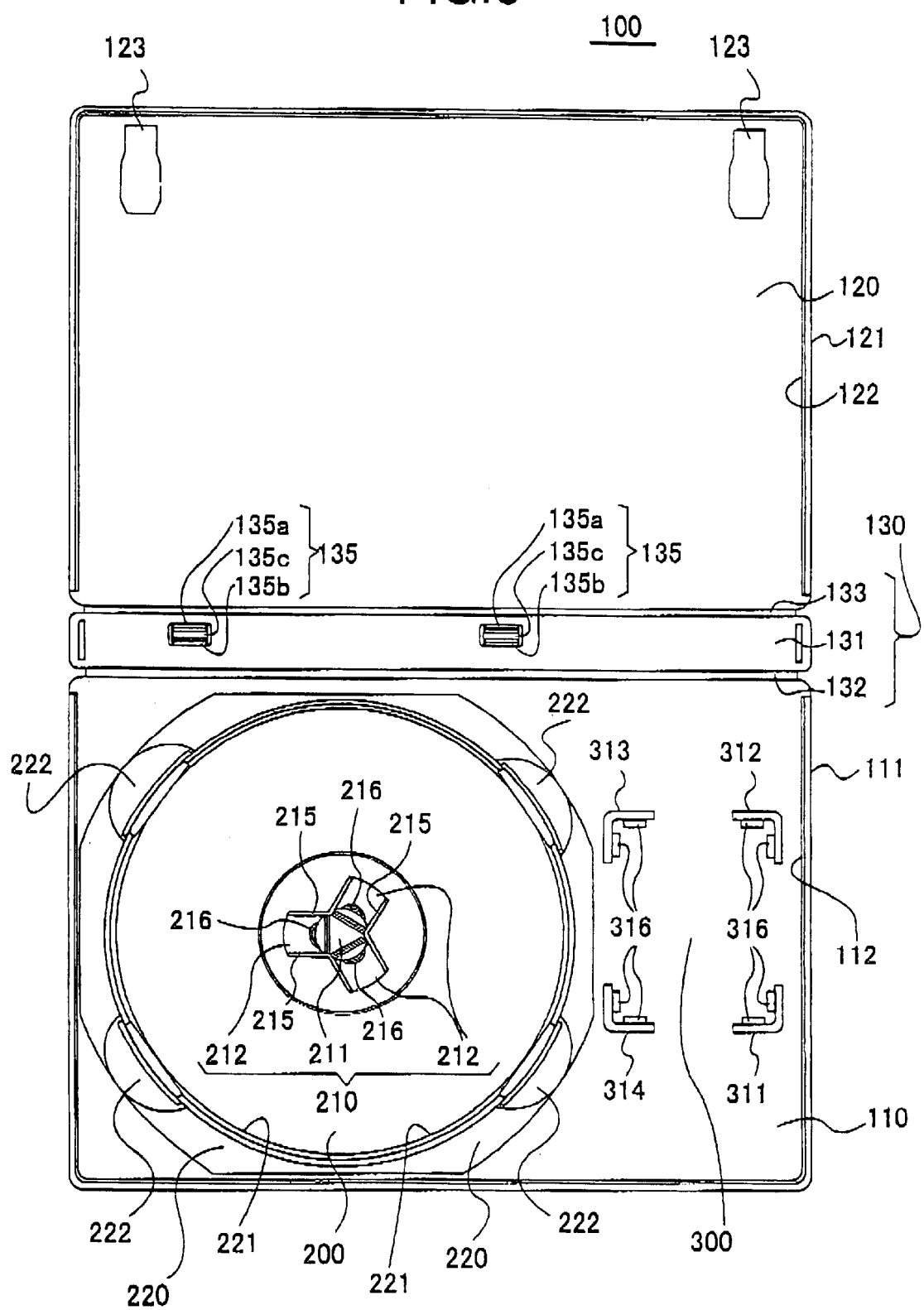

RECORDING MEDIUM HOLDER FOR ACCOMMODATING RECORDING MEDIUM AND INFORMATION PROVIDING BODY ACCOMMODATING RECORDING MEDIUM

This application claims a priority based on Japanese Patent Application Nos. 2000-034263 and 2001-1221 filed on Feb. 10, 2000 and Jan. 9, 2001 respectively, the entire contents of which are incorporated herein by reference for all purposes.

BACKGROUND OF THE INVENTION

The present invention relates to a recording medium holder for accommodating a recording medium in which information to be supplied to an information processing apparatus is recorded, and an information providing body contained in the recording medium holder in which the recording medium is accommodated, and particularly to a recording medium holder for accommodating not only the recording medium, but also a recording device for recording data relevant to the processing of information in the information processing apparatus, and an information providing body in which the recording medium and the recording device are accommodated in the recording medium holder.

There is known such a game apparatus that when a game is executed, data relevant to the game (hereinafter referred to as "relevant data") are created in connection with the execution of the game. Types of relevant data generated are for example various set-up information, instructions for playing the game which are made in response to various operations of players, information representing a game progress situation, etc. In general, a recording device for recording data can be mounted in this type of game apparatus. Therefore, when the game is interrupted, the relevant data thus created can be recorded in the recording device. Accordingly, when the game is resumed, the game can be continued from the point where it was interrupted, without re-starting the game from the first stage thereof, by using the relevant data recorded in the recording device. Further, even when the interrupted game is re-started in a different game apparatus, the game can be continued from the point where it was interrupted by using the relevant data.

In general, a user of a game apparatus purchases plural kinds of game software and executes the respective games. In this case, relevant data must be recorded every game. However, the recording device has a limited recording capacity, and thus the data amount of relevant data recordable in the recording device is also limited. Therefore, there may occur such a situation that the relevant data cannot be recorded when a game is interrupted. In order to avoid this situation, the user is required to prepare a new recording device at all times. Further, if the user enjoys many games, there would exist a plurality of recording devices in which the relevant data corresponding to various kinds of game software are recorded. In order to support this situation, it is necessary to prepare the recording device to be compatible with the game software, and store the recording device.

However, such a recording device is supplied as an attachment for a game apparatus or an optional part from a maker of the game apparatus. On the other hand, the game software used in the game apparatus is supplied from a software maker producing the game software in the form of a recording medium such as CD-ROM or the like in which the software is recorded. That is, a recording device has been hitherto supplied irrespective of a recording medium in which software is recorded. Therefore, the user himself/ herself must prepare a recording device and keep the recording device having the relevant data recorded therein in connection with the corresponding game software.

This type of game apparatus is used by people in a wide age bracket from infants to older persons. Further, a plurality of members of a family usually use a game apparatus in a home. Therefore, it is necessary to enable any person to prepare and keep the recording device.

Such a problem is not limited to the game software. For example, the game apparatus originally serves as an information processing apparatus, and thus the game apparatus can be used for various purposes other than the games, such as reproduction of image, reproduction of sound, communications and other information processing. In such a situation, the recording device can be used to record relevant data generated through these various processing. In these cases as well, however, the above problem may occur. Further, the same problem may occur when a game is executed in a personal computer, the relevant data generated through the execution of the game are recorded and then the game concerned is resumed in a game apparatus, and vice versa.

SUMMARY OF THE INVENTION

An object of the present invention is to provide a recording medium holder with which any one can easily keep a recording device keeping compatibility to information of corresponding software or the like.

Another object of the present invention is to provide an information providing body with which any one can easily prepare and keep while keeping compatibility with information of corresponding software or the like, and also can make the recording device compatible with the recording medium in which the information is recorded.

In order to attain the above object, according to a first aspect of the present invention, a recording medium holder for accommodating a recording medium in which information to be supplied to an information processing apparatus is recorded, includes a first member and a second member between which a space for accommodating the recording medium and the recording device therein is formed under the state that the first and second members are confronted to each other, and a link member for linking the first and second members to each other so as to be folded so that they are confronted to each other, wherein at least one of the first and second members has a first accommodating area in which at least one recording medium to be held can be accommodated, and a second accommodating area in which at least one recording device for recording data are recorded can be accommodated, the link member has a fixing portion for fixing an auxiliary accommodating member in which at least one recording medium to be held can be accommodated, and the fixing portion is disposed so as to be fixed to the link member so that the auxiliary accommodating member is located between the first and second members.

According to a second aspect of the present invention, a recording medium holder for accommodating a recording medium in which information to be supplied to an information processing apparatus is recorded, includes a first member and a second member between which a space for accommodating the recording medium and the recording device therein is formed under the state that the first and second members are confronted to each other, a link member for linking the first and second members to each other so as to be folded so that they can be confronted to each other, and an auxiliary accommodating member fixed to the first member, wherein at least one of the first and second members has a first accommodating area in which at least one recording medium to be held can be accommodated, and a second accommodating area in which at least one recording device for recording data can be accommodated, and the auxiliary accommodating member has an area in which at least one recording medium to be held can be accommodated, and is fixed to the link member while the auxiliary accommodating member is located between the first and second members.

According to a third aspect of the present invention, an information providing body for supplying information to an information processing apparatus includes a recording medium in which information to be supplied to the information processing apparatus is recorded, a recording device for recording data and a recording medium holder for accommodating the recording medium and the recording device, wherein the recording medium holder is the recording medium holder of the first aspect of the present invention, and the recording medium is accommodated in the first accommodating area.

According to a fourth aspect of the present invention, an information providing body for supplying information to be supplied to an information providing body includes a recording medium for recording information to be supplied to the information processing apparatus, a recording device for recording data and a recording medium holder for accommodating the recording medium and the recording device, wherein the recording medium holder is the recording medium holder of the second aspect of the present invention and the recording medium is accommodated in at least one of the following: the first accommodating area and the auxiliary accommodating member.

BRIEF DESCRIPTION OF THE DRAWINGS

FIG. 5 is a side view showing a detaching process of an auxiliary accommodating member in the recording medium holder according to the first embodiment of the present invention;

FIG. 6 is a plan view showing a state that the auxiliary accommodating member is detached from the recording medium holder of the first embodiment of the present invention;

DETAILED DESCRIPTION OF THE PREFERRED EMBODIMENTS

Preferred embodiments according to the present invention will be described hereunder with reference to the accompanying drawings, In the following embodiments, the present invention is applied to a recording medium holder for accommodating both a recording medium having game software recorded therein and a recording device used to record relevant data which is created in connection with execution of a game, and also to an information providing body. It is needless to say that the recording medium holder and the information providing body according to the present Invention are not limited to an apparatus for game software recorded therein and its recording device and to an apparatus for accommodating these parts, respectively.

Figure 17:
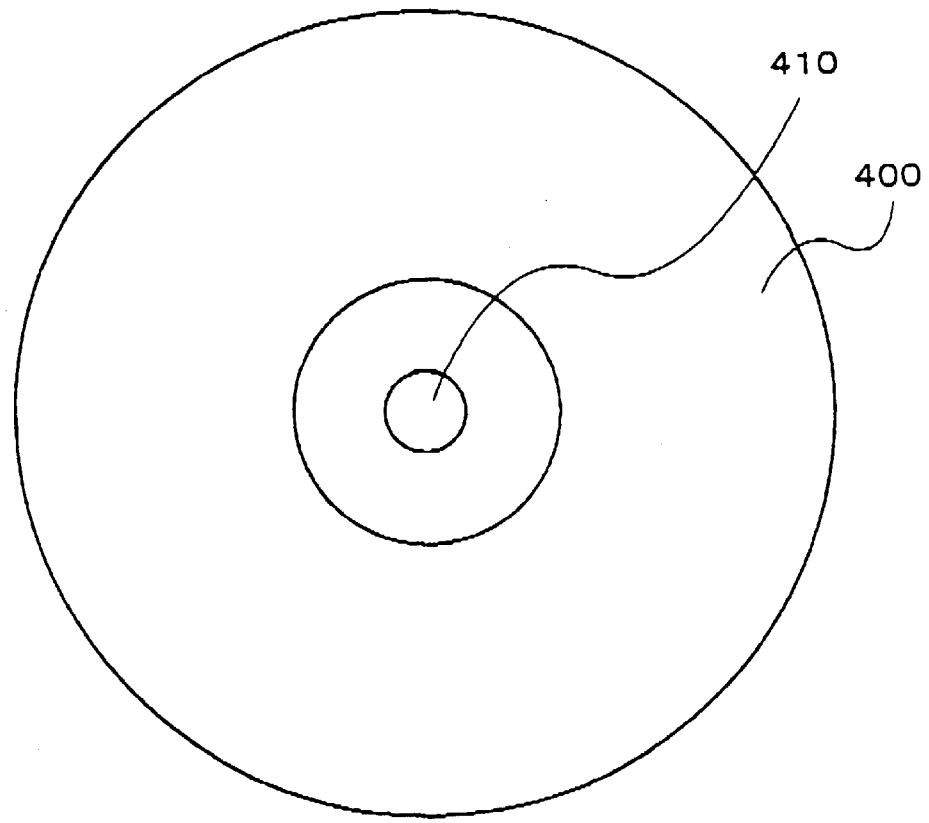
FIG. 17 is a perspective view showing a disc type recording medium accommodated in the recording medium holder of the present invention.

In the embodiments of the present invention, a disc type recording medium 400 shown in FIG. 17 is targeted as a recording medium accommodated in a recording medium holder. CD, DVD or the like is used as this type of recording medium. As shown in FIG. 17, the disc type recording medium 400 has a center hole 410 which is located at the center portion thereof so that the disc type recording medium 400 can be penetrated.

Figure 13:
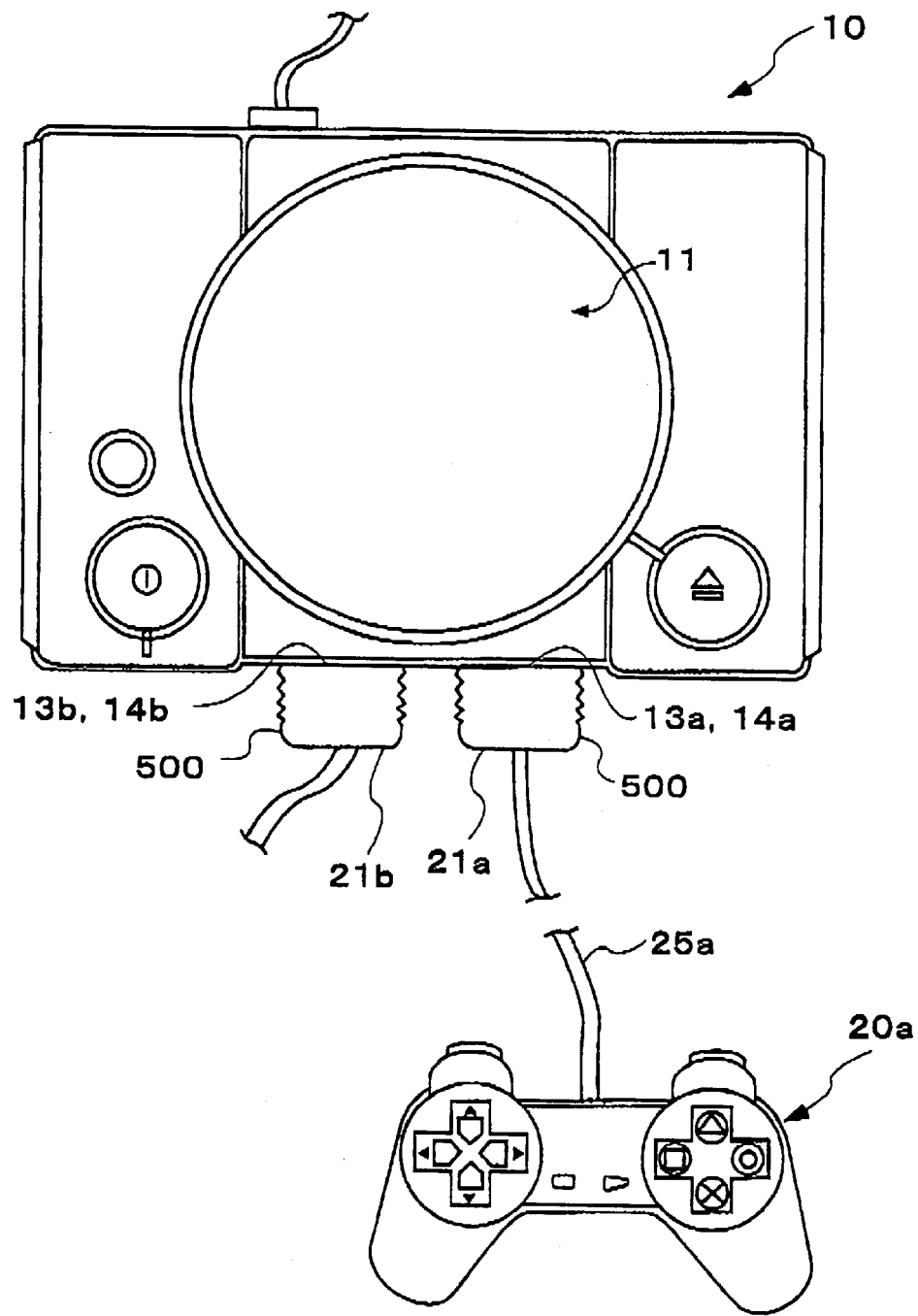
FIG. 13 is a plan view showing a game apparatus using a recording medium and a recording device, and a controller for the game apparatus.

The disc type recording medium 400 is mounted in a disc type recording medium reproducing portion 11 of a game apparatus 10 as shown in FIG. 13. Game software stored in the disc type recording medium is read into the game apparatus 10, and the game thereof is executed by the game apparatus 10.

A controller with which a players operates (enjoys) the game by carrying out various operations on the game apparatus is connected to a controller connection portion 14a or 14b of the game apparatus 10. Specifically, as shown in FIG. 13, a controller 20a is connected to the controller connection portion 14a through a plug 21a. Further, a television receiver (not shown) is connected as a monitor to the game apparatus 10. A plurality of (for example, two) controllers may be connected to the game apparatus 10. In the case shown in FIG. 13, a controller (not shown) is connected to the controller connection portion 14b through a plug (connection portion) 21b.

Further, a rewritable non-volatile memory, a member containing a non-volatile memory and a controller for controlling reading/writing operations from/into the memory or non-volatile memory is used as the recording device accommodated in the recording medium holder.

Figure 16:
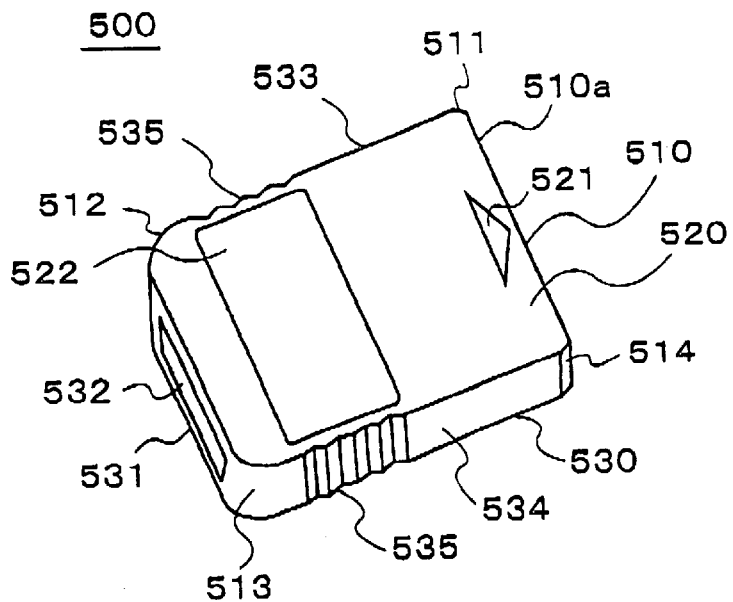
FIG. 16 is a perspective view showing a recording device accommodated in the recording medium holder of the present invention.

FIG. 16 shows a memory card 500 having a non-volatile memory as an example of the recording device.

The memory card 500 has a card case 510 and a board with a memory chip, a control circuit, wires, a connection terminal, etc. mounted thereon (all these parts are not shown) and which is accommodated in the card case 510.

The card case 510 is designed in a substantially flat rectangular parallelepiped, and has four corner portions 511 to 514 when viewed from the upper side. The corner portions 512 and 513 at the base end side are designed to have a curved surface. The tip side of the card case 510 serves as a connector portion 510a to be connected to the game apparatus. Not shown in detail, the connection terminal is disposed at the connector portion 510a. A triangular mark 521 for indicating the insertion direction when the memory card 500 is mounted in the game apparatus is affixed to the tip side of the upper surface 520 of the card case 510. Further, a label attaching portion 522 is provided at the base side of the upper surface 520.

A label attaching portion 532 is provided to the side surface at the base side on the side surfaces 530 of the card case 510. A label can be attached to the label attaching portion 532. The title of the corresponding software or the like may be written on the label. Further, uneven portions 535 having wave patterns are located on the side surfaces 533, 534 parallel to the insertion direction so as to be nearer to the base side. The uneven portions 535 have a function of indicating a user to the locations at which the fingers of the user must be put when the recording device 500 is grasped by the fingers to insert the recording device 500. Further, they serve as an antislipping member when the recording device 500 is grasped by the fingers.

Figure 14:
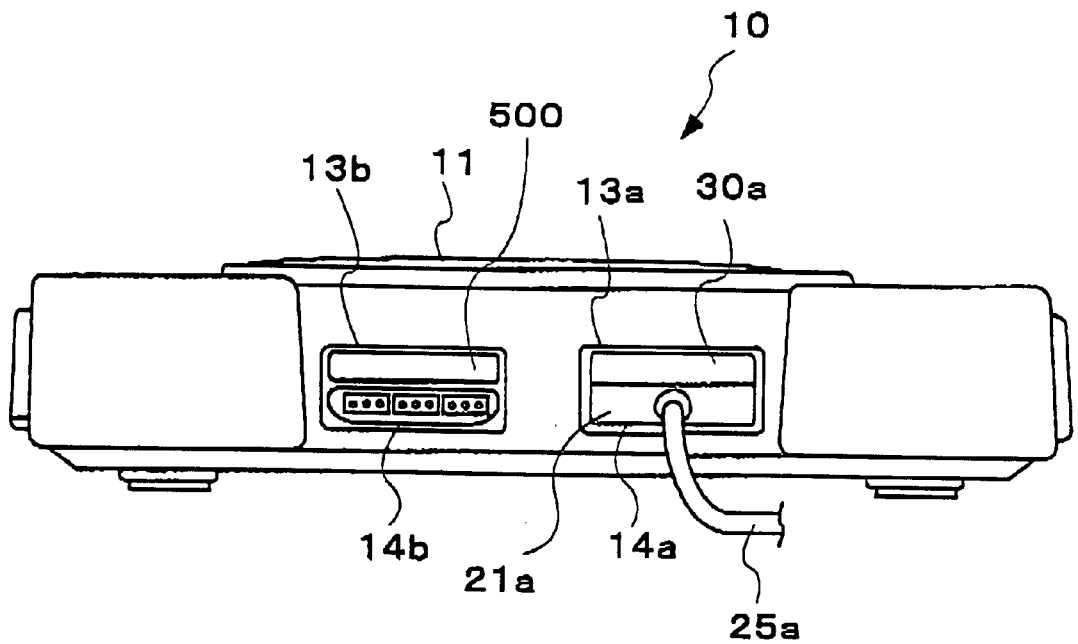
FIG. 14 is a front view showing the game apparatus.
Figure 15:
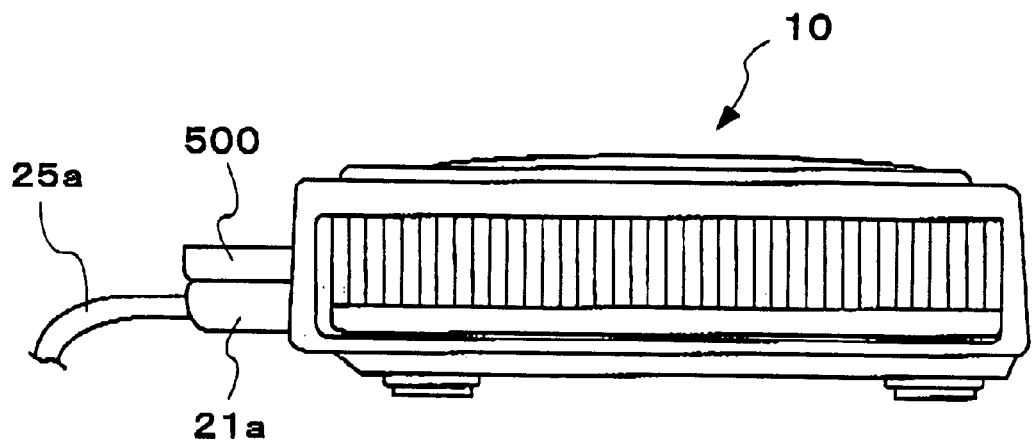
FIG. 15 is a side view showing the game apparatus.

As shown in FIGS. 13 to 15, the recording device 500 can be inserted into a recording device receiving portion 13a or 13b provided to the game apparatus 10, whereby the recording device 500 is connected to the game apparatus 10 through the connector portion 510a.

Next, the recording medium holder according to the present invention will be described.

FIGS. 1 to 7B show a recording medium holder according to a first embodiment of the present invention.

As shown in FIGS. 1 to 7B, the recording medium holder according to a first embodiment of the present invention has an accommodating member 100 for accommodating a recording medium and an auxiliary accommodating member 700 for accommodating a recording medium. The accommodating member 100 has a first accommodating area 200 in which one recording medium is accommodated, and a second accommodating area in which a recording device for recording data is accommodated. The auxiliary accommodating member 700 has an area in which a recording medium is accommodated. The data to be recorded are the data generated in association with the execution of the game in the game apparatus.

The accommodating member 100 comprises a first member 110, a second member 120 and a link member 130. In this embodiment, the first member 110 and the second member 120 are linked to each other through the link member 130. These members 110, 120 and 130 may be formed of synthetic resin material to be an integral unit. The accommodating member 100 can be folded so that the first member 110 and the second member 120 are confronted to each other. With this structure, the first member 110 and the second member 120 serve as front and back cover sheets, and the link member 130 serves as the back cover. That is, the accommodating member 100 is designed to have an overall folder shape. In this embodiment, the auxiliary accommodating member 700 exists between the first member 110 and the second member 120. The auxiliary accommodating member 700 may be formed of the same material as the accommodating member 100.

Figure 4:
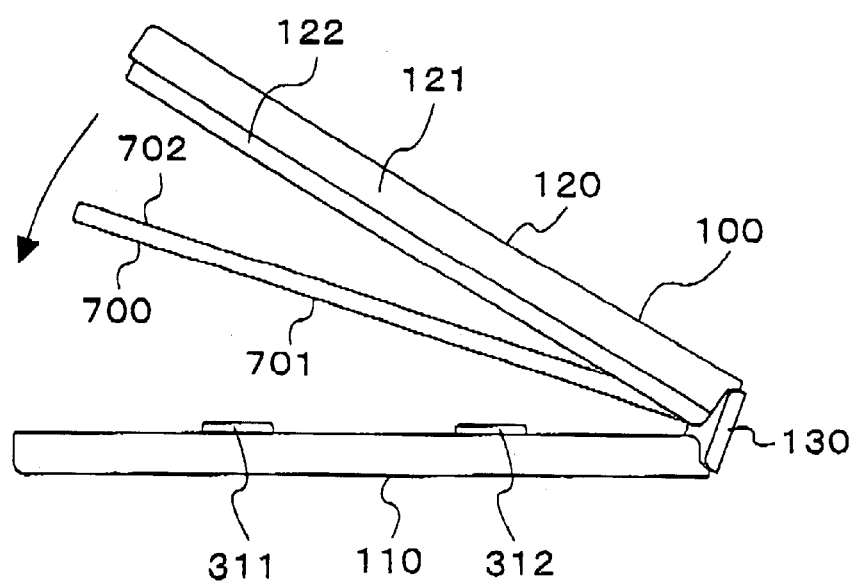
FIG. 4 is a side view showing a folding process of the recording medium holder according to the first embodiment of the present invention.

FIG. 4 shows the folding process of the first member 110 and the second member 120. The recording medium 400 is accommodated in the space which is formed by the first member 110 and the auxiliary accommodating member 700 confronted to each other. Further, the recording device 500 is accommodated in the space which is formed by the first member 110 and the second member 120 confronted to each other.

Figure 1:
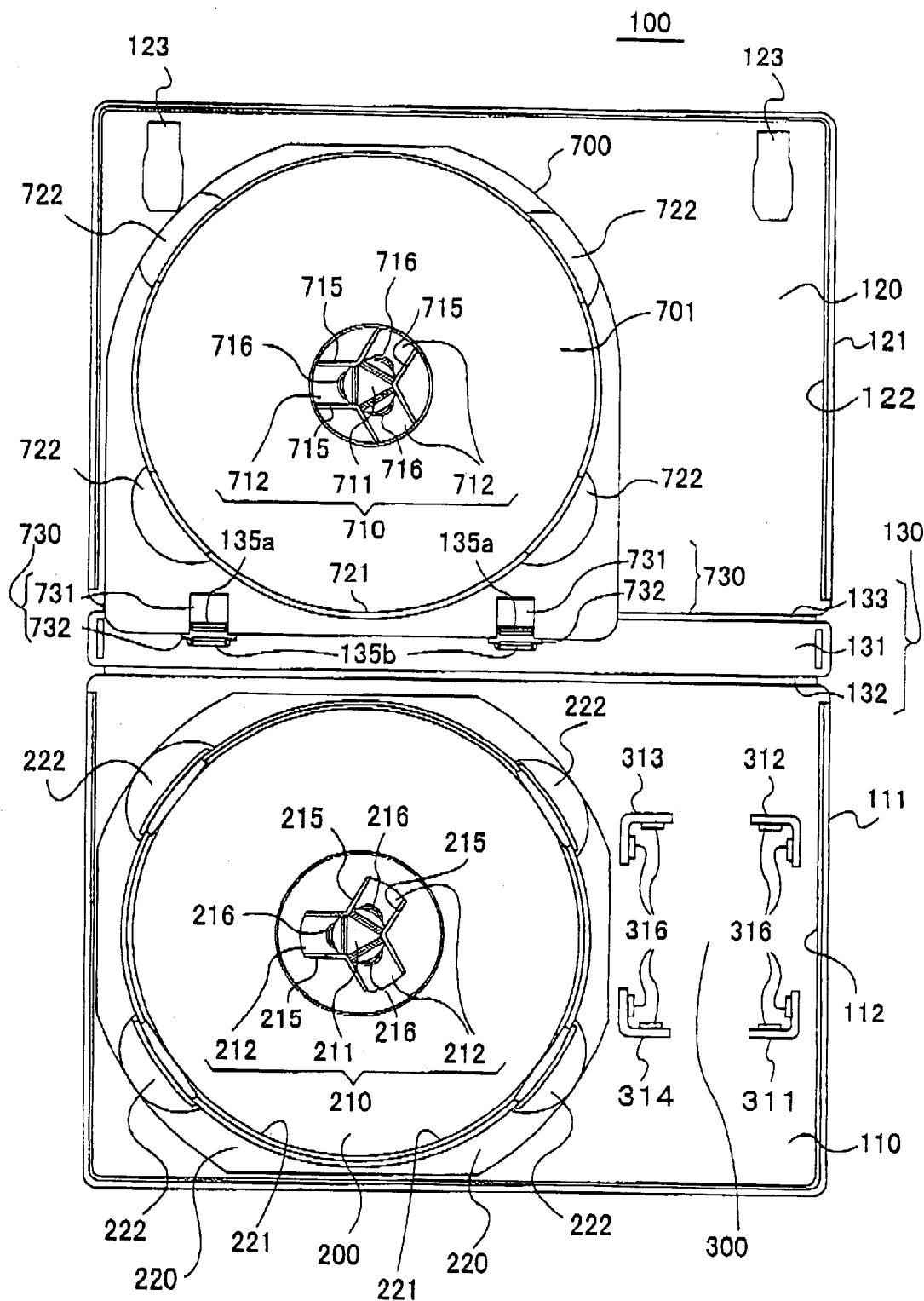
FIG. 1 is a plan view showing an example of a recording medium holder according to a first embodiment of the present invention when the holder is opened.

The first accommodating area 200 and the second accommodating area 300 are disposed in the first member 110. As shown in FIG. 1, the first accommodating area 200 is disposed at one side along the longitudinal direction of the first member 110, and the second accommodating area 300 is disposed at the other side along the longitudinal direction of the first member 110. The first accommodating area 200 and the second accommodating area 300 are disposed in the first member 110 so that the detaching work can be conducted on the recording medium 400 and the recording device 500 on the same surface, and thus the detaching work can be easily performed.

A frame portion 111 is provided to each of three sides of the peripheral edge of the board-shape member of the first member 110, and a step portion 112 is provided at the inside of each frame portion 111. When the second member 120 is folded over the step portion 112 so as to be superposed on the first member 110, a projecting side 122 provided inside the frame portion 121 of the second member described later is accommodated. The other side of the first member 110 is linked to the link member 130.

In the first accommodating area 200 are provided a holding mechanism 210 for holding a disc type recording medium 400 mounted there, and a frame portion 220 provided along the neighborhood of the outer periphery of the disc when the disc type recording medium 400 is mounted. The holding mechanism 210 and the frame portion 220 constitute a recording medium holding portion.

The holding mechanism 210 is provided with a fitting portion 211 for fitting the disc type recording medium 400 at the center hole 410 thereof to hold the disc type recording medium 400, and support portions 212 for supporting the disc type recording medium 400, the fitting portion 211 and the support portions 212 being integrally provided to the holding mechanism 210. The support portions 212 are disposed to be radial with the fitting portion 211 at the center thereof. A notched portion 215 is provided to each support portion 212 except for the portion connected to the first member 110. Accordingly, the support portions 212 can be displaced in the up-and-down direction. Further, the support portions 212 urge the fitting portion 211 so as to push the fitting portion 211 upwardly. Plural pawl portions 216 are provided on the outer periphery of the fitting portion 211. The recording medium are caught by these pawl portions 216 so as to be prevented from easily falling off.

Figure 7A:
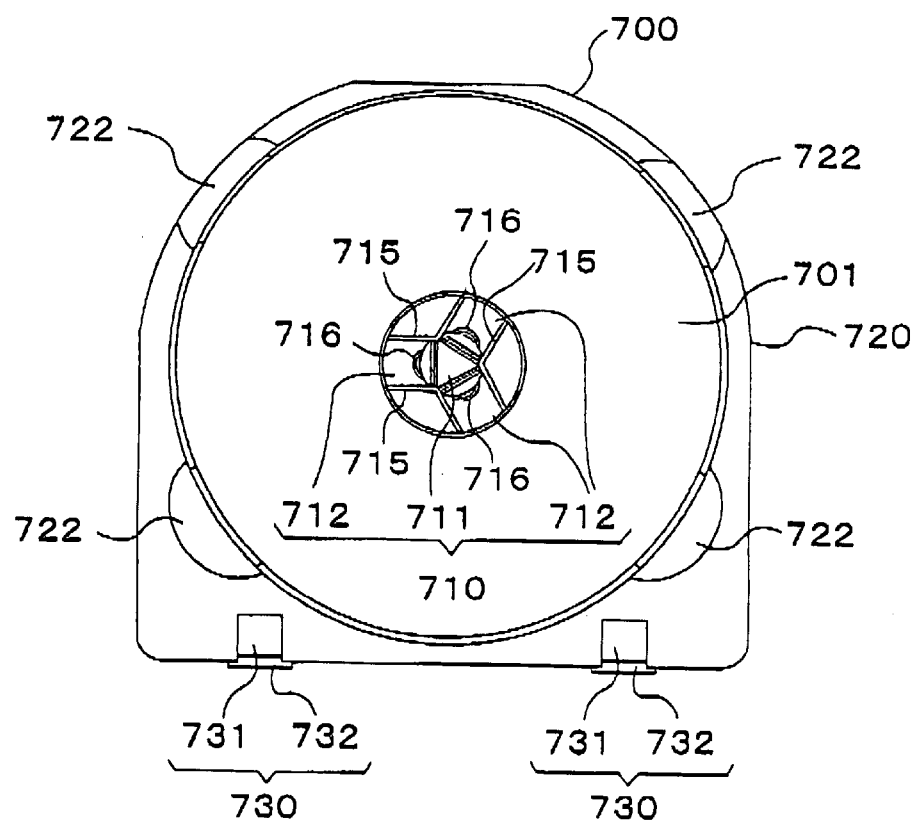
FIG. 7A is a plan view showing an example of the auxiliary accommodating member used in the recording medium holder according to the present invention.
Figure 7B:
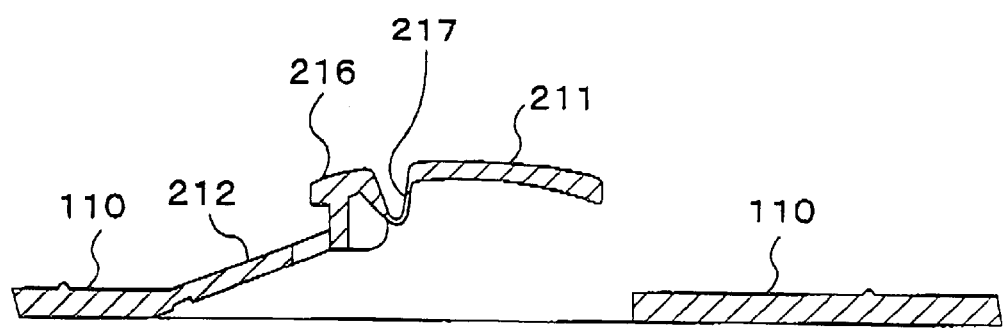
FIG. 7B is an enlarged view showing a fitting portion 211 and a support portion 212 of the auxiliary accommodating member.

FIG. 7B is an enlarged partial view showing the fitting portion 211 and the support portion 212. As shown in FIG. 7B, the support portion 212 is integrally liked to the first member 110 at the base side thereof. The fitting portion 211 is integrally-linked to the tip side of the support portion 212. The fitting portion 211 is provided so as to project from the tip of the support portion 212 upwardly. The projection height of the fitting portion 211 is determined in consideration of the thickness of the recording medium to be held. The fitting portion 211 has plural pawl portions 216 at the upper outer edge thereof. These pawl portions 216 fit the recording medium 400 at the edge of the opening portion of the center hole 410 of the recording medium 400. Three stretchable portions 217 are disposed on the fitting portion 211 so as to form a triangle in connection with the pawl portions 216. When the recording medium is detached, these stretchable portions 217 are contracted, whereby the tips of the pawl portions 216 are allowed to pass through the center hole 410 of the recording medium. Further, when the recording medium is held, the stretchable portions 217 act so that the pawl portions 216 project outwardly, thereby surely holding the recording medium.

The holding mechanism 210 is not limited to that of the above embodiment, and it may be any well-known holding mechanism used to hold such a disc type recording medium 400 as described above.

The frame portion 220 is constructed by a projecting portion which is disposed so as to surround the outside of the disc type recording medium when the disc type recording medium 400 is held inside the frame portion 220. The frame portion 220 is integrally formed of the same material as the first member 110. A step portion 221 is provided inside the frame portion 220 to support the peripheral edge of the disc type recording medium 400. The inside of the frame portion 220 serves as the accommodating area for the disc type recording medium 400 (see FIG. 8). The frame portion 220 is provided with plural notched portions 222 to form spaces with which the mounted disc type recording medium 400 is detached. Each of the notched portions 222 forms a space in which a finger abuts against the outer periphery of the disc type recording medium 400.

Projecting portions 311 to 314 constituting a recording device holding portion for holding the recording device 500 are disposed in the second accommodating area 300. In the case of FIG. 1, each of the projecting portions 311 to 314 is formed in L-shape when viewed from the upper side. The recording device 500 is mounted in the area surrounded by the projecting portions 311 to 314. At this time, each of the projecting portions 311 to 314 presses against a part of the side surface 530 of the recording device 500 and holds the recording device 500 so that the recording device 500 is not detached therefrom. In this embodiment, these projecting portions 311 to 314 come into contact with the corresponding corner portions 511 to 514 of the recording device 500 (see FIG. 16) to hold the recording device 500 (see FIG. 8).

With the above structure, the accommodating member 100 can be more easily manufactured as compared with the case where the entire peripheral surface of the side surface 350 of the recording device is surrounded. In addition, when the mounted recording device 500 is taken out, it is easier to put fingers on the side surface 530, so that the recording device 500 can be more easily taken out. Further, even when the recording device 500 is mounted, it can be mounted while the side surface 530 of the recording device 500 is grasped by the fingers, and thus the mounting of the recording device 500 can also be more easily performed. Particularly when a recording device used for a game is accommodated, the above structure is more effective from the viewpoint of enabling the recording device 500 to be easily taken out by people in a wide age bracket.

Figure 2:
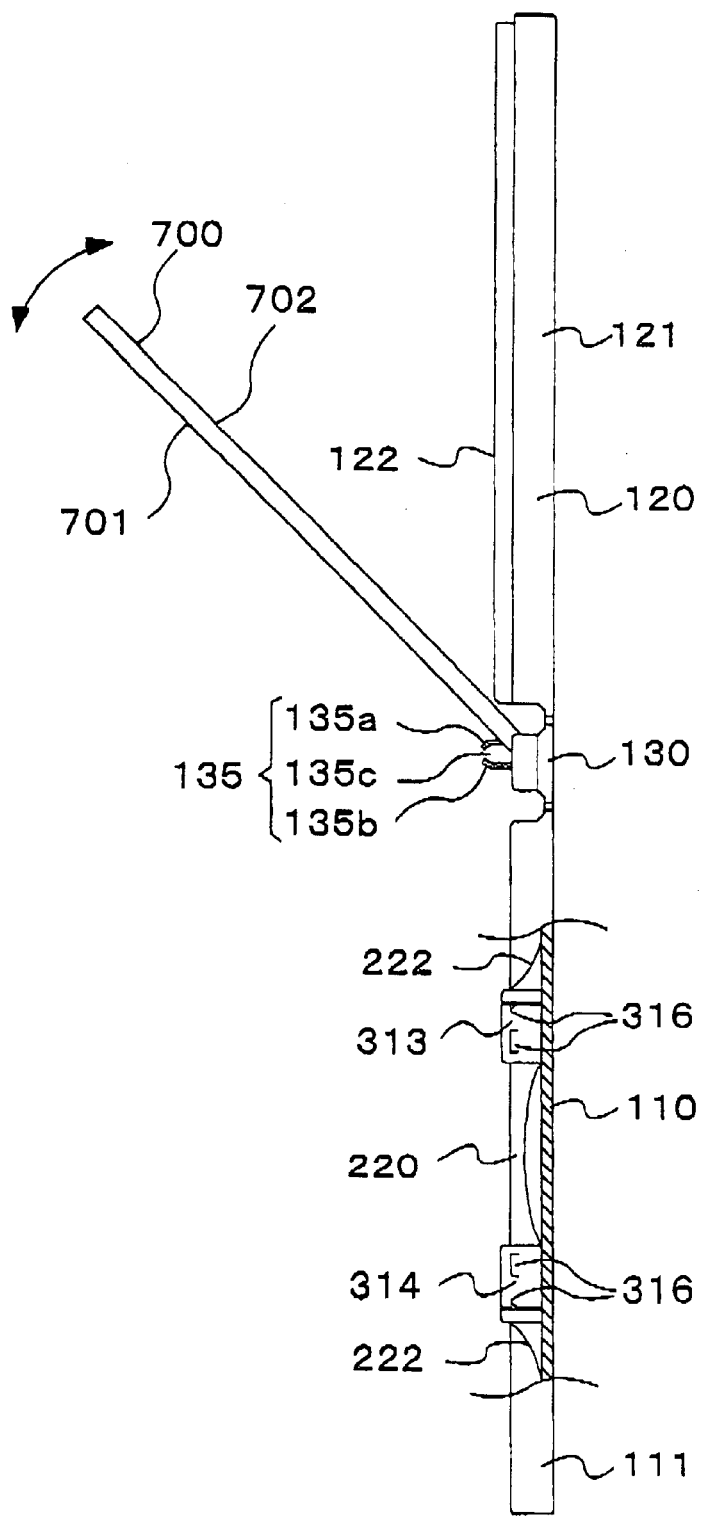
FIG. 2 is a side view showing the recording medium holder according to the first embodiment of the present invention, which contains a partially cross-sectional view.
Figure 3:
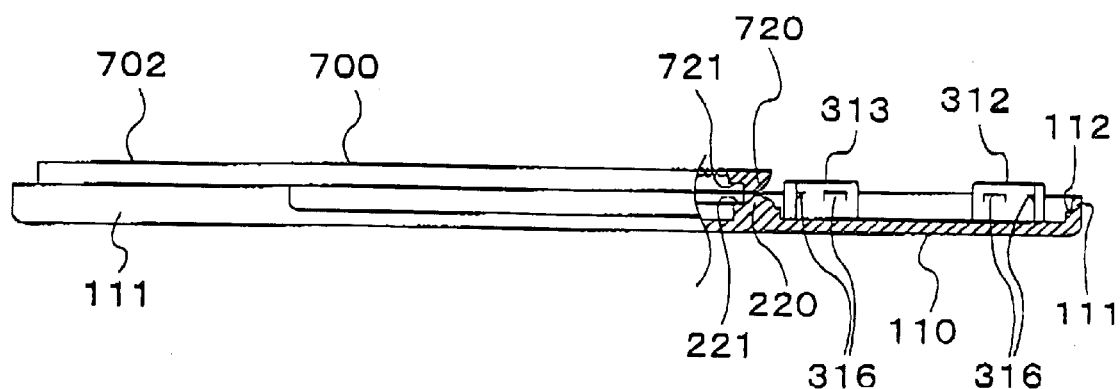
FIG. 3 is a front view showing the recording medium holder according to the first embodiment of the present invention, which contains a partially cross-sectional view.

A fitting portion 316 projecting inwardly is provided to the upper portion of each of the projecting portions 311 to 314. The fitting portion 316 is brought into contact with the peripheral edge of the upper surface of the recording device 500 mounted to prevent the recording device 500 from falling off. With this structure, the recording device 500 can be more surely held. The shape and size of each fitting portion 316 and the number of fitting portions 316 arranged may be suitably set. In this embodiment, as shown in FIGS. 2 and 3, each fitting portion 316 is designed to have a wedge-shape in section which is gradually increased in thickness from the lower side to the upper side, whereby the recording device 500 can be slid on the slant surface of each fitting portion 316 when it is taken out and the detachment of the recording device 500 can be more easily performed.

On the other hand, no fitting portion 316 need be provided to any of the projecting portions 311 to 314. In this case, the recording device contact surface of the upper portion of each of the projecting portions 311 to 314 may be shaped so as to project further inward as compared with the base portion thereof. For example, the projecting portions 311 to 314 are provided so as to be inclined inwardly. With this structure, the force of holding the recording device 500 can be magnified and the recording device 500 can be more surely held. Further, even when the recording device 500 is repetitively detached, the holding force of the projecting portions 311 to 314 can be kept high after a higher number of detachments, and thus enhancement in durability can be expected.

As described above, the projecting side 122 inside the frame portion 121 of the second member 120 is fitted in the frame portion 111 of the first member 110 at the position corresponding to the step portion 112 inside the frame portion 111 of the first member 110. The first member 110 and the second member 120 form the space in which the recording medium 400 and the recording device 500 are accommodated. In this embodiment, the second member 120 also serves as if it is a lid for the first member 110. In this embodiment, a pair of clips 123 are further provided to the second member 120 to hold a manual 600 which explains how to play the game based on the game software recorded in the recording medium 400 (see FIG. 8) or the like.

The link member 130 is located between the first member 110 and the second member 120 and integrally linked to these members. The link member 130 comprises a back plate portion 131 serving as the back cover when the accommodating member 100 is folded, and hinge portions 132 and 133 serving as hinges.

The link member 130 may be provided on the side, perpendicular to the above position of the first member 110 and linked to the second member 120 there. Further, the above structure may be modified so that link members 130 are provided on two parallel sides and the second member is constructed from two members, so that the second member is constructed as double doors. Besides, it may be modified so that two second members are closed to be overlapped with each other from the right and left sides.

An auxiliary accommodating member fitting portion 135 is provided to the link member 130 (see FIGS. 1, 2 and 5). The auxiliary accommodating member fitting portion 135 has holding members 135a and 135b for holding the shaft portion 732 (see FIG. 7A) of an auxiliary accommodating member 700 described later. The holding members 135a and 135b are disposed at such an interval that the shaft portion 732 is rotatably supported between the holding members 135a and 135b, and also they form a slit 135c having a narrower width than the thickness of the shaft portion 732 at the tip portions thereof. The shaft portion 732 is detachably mounted through the slit 135c. In addition, since the slit width is narrower than the thickness of the shaft portion 732, the shaft portion 732 mounted is hard to detach.

As shown in FIG. 7A, the auxiliary accommodating member 700 has an accommodating area 701 for accommodating the disc type recording medium 400, a recording medium holding portion 710 for holding fast the recording medium 400 accommodated in the accommodating area 701, a frame portion 720 which surrounds the accommodating area 701, and link portions 730 for linking the auxiliary accommodating member 700 to the auxiliary accommodating member fitting portion 135.

Like the disc type recording medium to be accommodated, the accommodating area 701 is designed in a circular recess-shape. The recording medium 400 is accommodated in the accommodating area 701. When the disc type recording medium is accommodated in the accommodating area 701, the outer periphery of the disc is set to be surrounded by the frame portion 720. The holding mechanism 710 and the frame portion 720 constitute the recording medium holding portion.

The holding mechanism 710 comprises a fitting portion 711 which is fitted to the recording medium 400 at the outside of the center hole 410 of the disc type recording medium 400 to hold the disc type recording medium 400, and support portions 712 for supporting the fitting portion 711, the fitting portion 711 and the support portions 712 being integrally formed with each other. The support portions 712 are radially arranged with the fitting portion 711 at the center thereof. Except for the portion connected to the first member 110, each support portion 712 is provided with a notched portion 715. Accordingly, the support portions 712 can be displaced in the up-and-down direction. Further, they serve to support the fitting portion 711 and also energize the fitting portion 711 so as to push the fitting portion 711 upwardly. Further, plural pawl portions 716 are provided on the outer periphery of the fitting portion 711. The pawl portions 716 prevent the recording medium from easily falling off. The fitting portion 711 and the support portions 712 have the same structures as the fitting portion 211 and the support portions 212 (as shown in FIG. 7B) described above. Further, they have the same functions as the fitting portion 211 and the support portions 212 to easily detachably hold the recording medium. Accordingly, the same description thereof is omitted.

The holding mechanism 710 is not limited to that of the above embodiment, and also a well-known holding mechanism used to hold a disc type recording medium 400 as described above may be used.

The frame portion 720 is constructed by a projecting portion arranged so as to surround the outside of the disc type recording medium 400 when the disc type recording medium 400 is held inside the frame portion 720. The frame portion 720 is formed of the same material as the accommodating area 701 so as to be integral with the accommodating area 701. A step portion 721 is provided inside the frame portion 720 to support the peripheral edge of the disc type recording medium 400 mounted. The inside of the frame portion 720 serves as the accommodating area of the disc type recording medium 400 (see FIG. 8). Further, the frame portion 720 is provided with plural notched portions 722 forming spaces to detach the disc type recording medium 400 mounted.

The link portions 730 are provided to one edge portion of the auxiliary accommodating member 700. Each of the link portions 730 has a shaft portion 732 to be fixed to the auxiliary accommodating member fitting portion 135, and a through hole 731 provided so as to be adjacent to the shaft portion. The through hole 731 is used to prevent the rotation of the auxiliary accommodating member 700 around the shaft portion 732 from being disturbed. That is, when the auxiliary accommodating member 700 is rotated around the shaft portion 732, the holding member 135a penetrates through the through hole 731 (see FIG. 2), whereby the holding member 135 can be prevented from disturbing the rotation of the auxiliary accommodating member 700.

The auxiliary accommodating member 700 may be disposed so that the accommodating area 701 and the first accommodating area 200 face in the same direction when the first member 110 and the second member 120 are opened as shown in FIG. 1. Further, the auxiliary accommodating member 700 may be designed to rotate around the shaft portion 732 as shown in FIG. 2 and also be overlaid on the first accommodating area 200 as shown in FIG. 3. At this time, the accommodating area 701 and the first accommodating area 200 are confronted to each other. When the first member 110 and the second member 120 are closed, the auxiliary accommodating member 700 is interposed between the first member 110 and the second member 120 as shown in FIG. 4. At this time, as shown in FIG. 3, the accommodating area 701 is confronted to the first accommodating area 200. It is needless to say that the auxiliary accommodating member 700 may be secured in the opposite direction to the direction described above. In this case, the accommodating area 701 and the first accommodating area 200 are not confronted to each other.

Further, the auxiliary accommodating member 700 may be detachably mounted on the accommodating member 100. For example, as shown in FIG. 5, the auxiliary accommodating member 700 is linked to the auxiliary accommodating member fitting portion 135 by inserting the shaft portion 732 into the gap between the holding members 135a and 135b through the slit 135c of the auxiliary accommodating member fitting portion 135. Conversely, the auxiliary accommodating member 700 is detached from the auxiliary accommodating member fitting portion 135 by detaching the shaft portion 732 from the gap between the holding members 135a and 135b through the slit 135c of the auxiliary accommodating member fitting portion 135.

FIG. 6 shows the accommodating member 100 when the auxiliary accommodating member 700 is detached therefrom, and FIG. 7A shows the auxiliary accommodating member 700 which is not fitted to the accommodating member 100.

Figure 8:
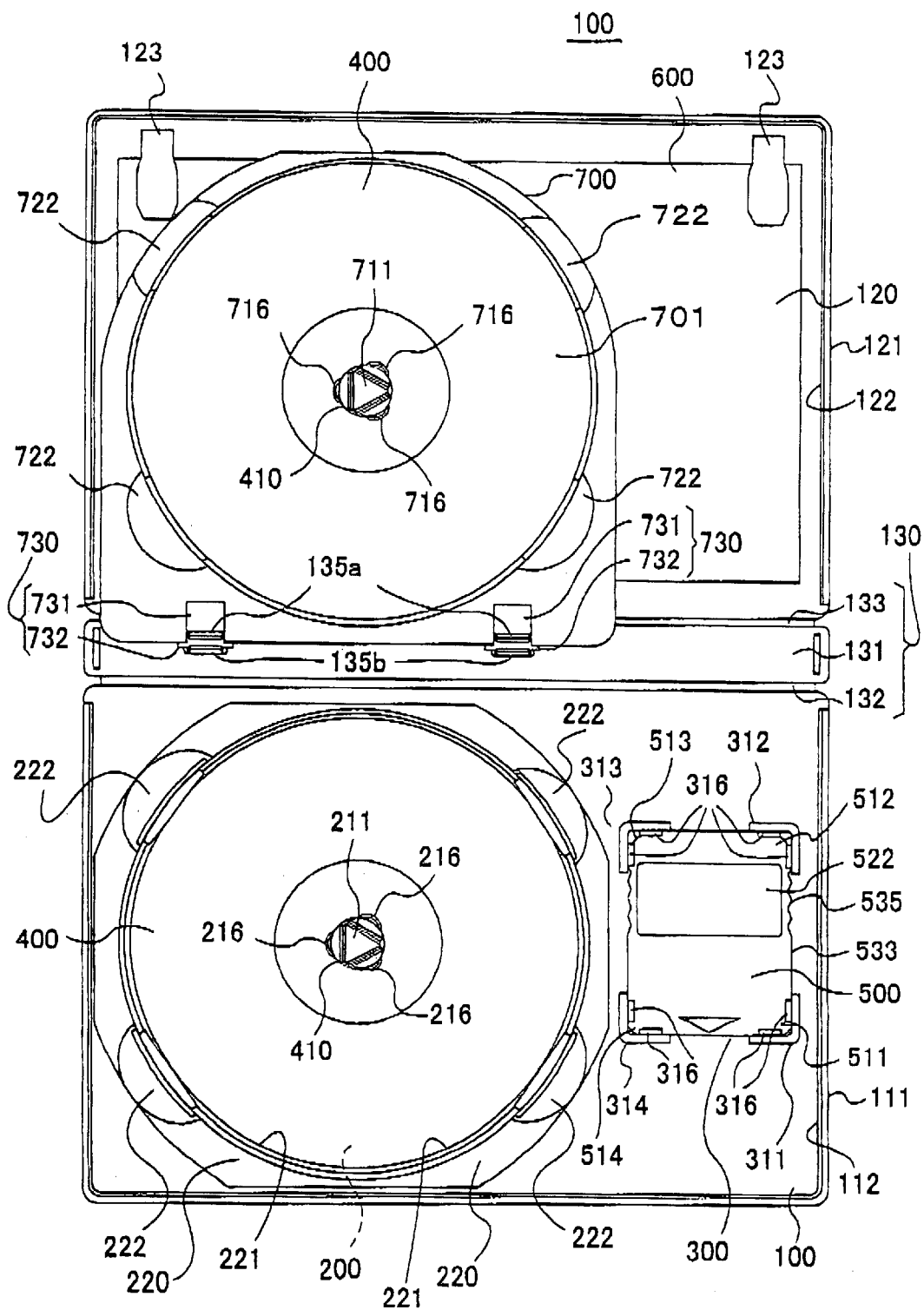
FIG. 8 is a plan view showing an information providing body according to a second embodiment of the present invention.

The recording medium holder of the embodiment thus constructed accommodates both the disc type recording media 400 and the recording device 500 therein as shown in FIG. 8. That is, the recording medium holder of this embodiment accommodates the disc type recording media 400 in the first accommodating area 200 of the first member 110 and in the accommodating area 701 of the auxiliary accommodating member 700. Further, the second accommodating area 300 is provided so as to be adjacent to the first accommodating area 200, and the flat rectangular parallelepiped recording device 500 can be accommodated in the second accommodating area 300. Therefore, according to this embodiment, two disc type recording media 400 and one recording device 500 can be accommodated.

When a disc type recording medium 400 is mounted in the first accommodating area 200, the disc type recording medium 400 is held by the holding mechanism 210. Likewise, when a disc type recording medium 400 is mounted in the accomodating area of the auxiliary accommodating member 700 the disc type recording medium 400 is held by the holding mechanism 710. Further, when a recording device 500 is mounted in the second accommodating area 300, the corner portions 511 to 514 of the recording device 500 are pressed against the side surface of the recording device by the projecting portions 311 to 314, and the projecting portion 316 fits over the upper surface of the recording device 500, whereby the recording device can be surely held.

With the above structure, a user of game software can stock the disc type recording medium 400 and the recording device 500 in the same container. As a result, the recording device 500 in which the data related to the software recorded in the recording medium 400 are recorded can be accommodated and kept in the same container as the disc type recording medium 400. Therefore, according to this embodiment, the recording device 500 can be kept maintaining the connection between the recording device 500 and the recording medium in which the corresponding software is recorded without imposing any special load on the user of the game software. Particularly, the recording device 500 can be more surely kept by attaching a label having the title of the corresponding software recorded thereon to the label attaching portion 522 of the recording device 500. Further, according to this embodiment, two disc type recording media can be accommodated.

When the game is resumed, the recording medium 400 and the recording device 500 are taken out from the same accommodating member 100, and then mounted in the game apparatus 10 (see FIG. 13). Accordingly, the game can be resumed from the interrupted portion. At this time, the user of the game software is not required to pay special attention to the mounting in the game apparatus while the association between the recording medium 400 and the recording device 500 is kept.

FIG. 8 shows the construction of an information providing body according to a second embodiment of the present invention.

The information providing body shown in FIG. 8 comprises an assembly of the information accommodating member 100 shown in FIG. 1 and both of the disc type recording medium 400 and the recording device 500 which are accommodated in the information accommodating member 100. The structure of the recording medium holder used in the second embodiment is the same as shown in FIG. 1, and thus the same description thereof is omitted.

According to this embodiment, a software maker can ship products while a recording medium 400 in which information to be supplied, that is, game software, is recorded is accommodated in each of the first accommodating area 200 and the accommodating area 701 of the auxiliary accommodating member 700, and also the recording device 500 for recording data to be created in connection with these recording media 400 is mounted in the second accommodating area 300 as shown in FIG. 8. At the shipping time, a manual 600 is inserted into a clip 123 and appended to the second member 120. Under this state, the accommodating member 100 is folded around the link member 130 as shown in FIG. 4, and the second member 120 is fitted to the first member 110, thereby completing a product having a folder shape or book shape.

This structure enables the software maker to supply information (game software in this embodiment) to a user. In this case, at the time when the user purchases game software, the user can keep a recording device to be used in connection with the software concerned without separately preparing for the recording device by himself/herself. Accordingly, there can be avoided such a situation that it is impossible to record data because the user forgets to purchase a recording device. Further, after the user uses the software, the user can mount the recording medium 400 and the recording device 500 detached from the game apparatus on the first accommodating area 200 and the second accommodating area to accommodate these recording medium and recording device in the accommodating member 100.

Accordingly, the recording medium 400 and the recording device 500 can be kept under the state that the software and the data are associated with each other. That is, the recording medium 400 and the recording device 500 can be kept while maintaining the association therebetween by merely returning the recording medium 400 and the recording device 500 into the accommodating member 100 from which they were taken out.

Accordingly, according to this embodiment, the user is not required to pay special attention in order to keep the association between the recording medium and the recording device. In the case of a recording medium in which game software is recorded, the corresponding game can be continued by using the recording medium and the recording device when the game is resumed as in the case of the recording medium holder as described above.

The foregoing effect can be further surely achieved by the software maker in advance attaching an indication describing the connection between the recording medium 400 and the recording device 500 to the label attaching portion 522 of the recording device.

If the information is supplied to the user in the form of an information providing body comprising an assembly of a recording medium holder and both a recording medium and a recording device which are accommodated in the recording medium holder, the recording medium and the recording device which have been hitherto separately packaged can be supplied as one package. Therefore, the present invention can reduce the packaging cost to be less than the prior art in which a packaging member is needed for both the recording medium and the recording device, because only one packaging member is needed in the present invention. Further, the amount of the packaging member wasted can be also reduced.

Further, since the recording medium and the recording device are accommodated in one recording medium holder, the space for accommodating the recording medium and the recording device can be reduced to less than when they are separately in stock and when they are separately kept.

Still further, according to this embodiment, two recording media 400 can be accommodated, and thus a long-time game which must be recorded over two recording media can be also supported by one package. In addition, two recording media in which games having relevance to each other are recorded can be accommodated in one package. For example, serialized games may be divided and recorded in two recording media.

In this embodiment, since the auxiliary accommodating member 700 can be detachably mounted in the accommodating member 100, the auxiliary accommodating member 700 may be added if necessary. Accordingly, a recording medium holder in which one recording medium is accommodated and a recording medium holder in which two recording media are accommodated can be constructed as the same container. Therefore, the number of the kinds of containers can be reduced.

In the second embodiment described above, both the recording medium and the recording device are accommodated in the recording medium holder. However, the present invention is not limited to the above embodiment. For example, products can be manufactured where only the recording medium is accommodated and no recording device is accommodated in the second accommodating area. That is, each product is manufactured under the state that no recording device 500 is mounted in the second accommodating area 300 in FIG. 5. In this case, at least the same effect as the first embodiment can be expected.

Further, each product may be shipped under the state that the auxiliary accommodating member 700 is detached therefrom, and the auxiliary accommodating member 700 may be afterwards shipped. For example, in the case of the game software, there is such a case that a recording medium in which a sequel (software) to a first-shipped game is recorded is shipped. In this case, the recording medium concerned can be shipped while accommodated in the auxiliary accommodating member 700. The auxiliary accommodating member 700 is linked to the auxiliary accommodating member fitting portion 135 of the previously shipped accommodating member 100, whereby the first-shipped game software and the sequel game software can be accommodated in the same recording medium holder.

Next, various modifications of the second accommodating area 300 of each of the above embodiments will be described with reference to FIGS. 9 to 12.

Each modification basically has the same structure as the accommodating member 100. However, there is a difference in the structure of the second accommodating area. Accordingly, the same sites as shown in FIG. 1 are represented by the same reference numerals, and the description on these parts is omitted because it is the same as that of the first embodiment.

Figure 9:
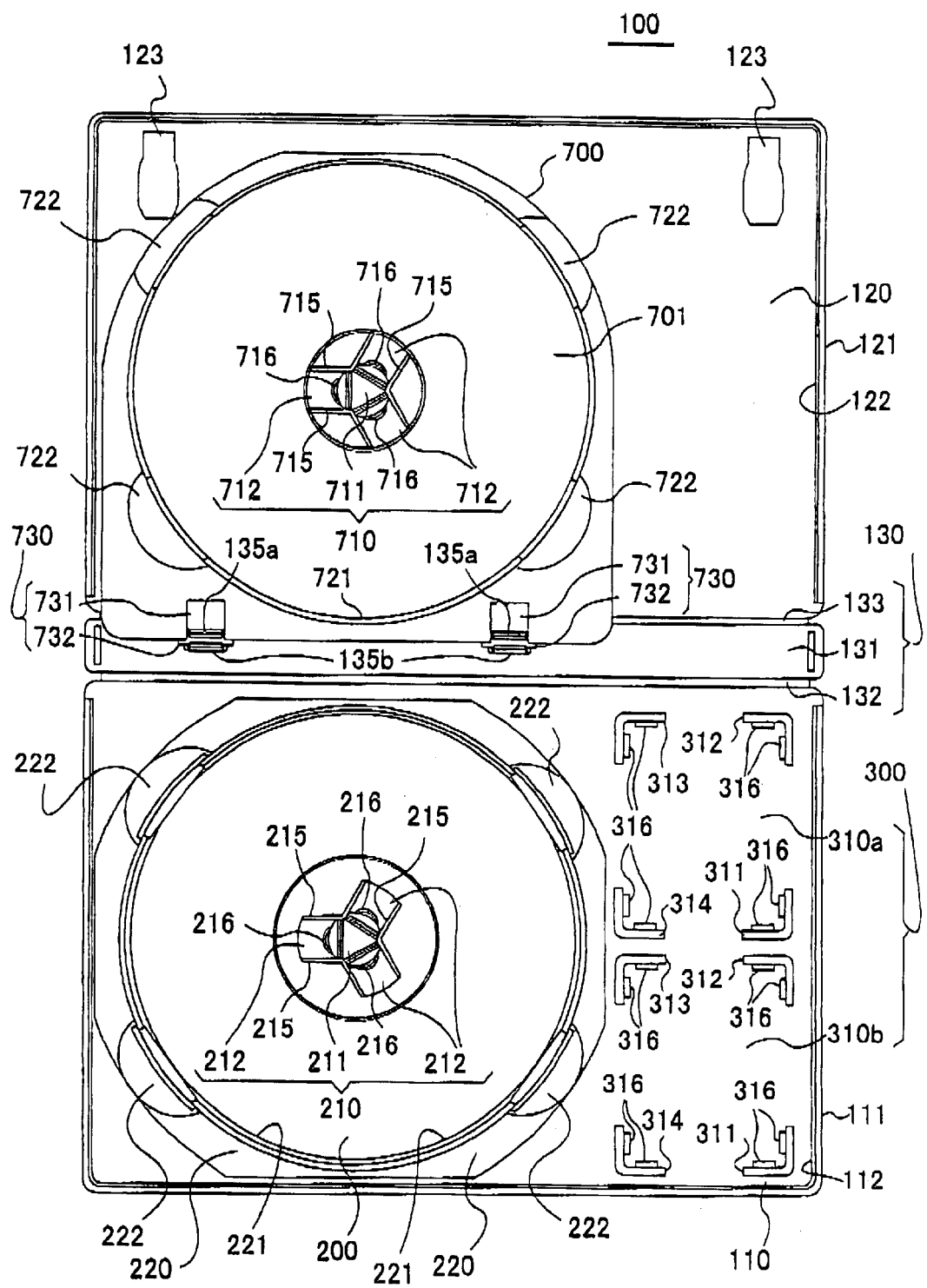
FIG. 9 is a plan view showing another example of a recording device holding portion of the recording medium holder according to the first embodiment of the present invention.

In the case of FIG. 9, two recording devices 500 can be accommodated in the second accommodating area 300. That is, two recording device holding portions 310a and 310b each comprising four projecting portions 311 to 314 each having the same structure as shown in FIG. 1 are arranged as shown in FIG. 9. The structure of each part and the holding action of the recording device 500 are the same as the recording device holding portion 300 shown in FIG. 1. According to this embodiment, two recording devices 500 can be held by one accommodating member.

Further, according to this embodiment, when game software recorded in the recording medium 400 is a game which is suitably carried out by two persons, the data can be recorded separately for each of the players.

Still further, according to this embodiment, when it is expected that the amount of data to be recorded in the recording device 500 is large, this situation can be easily supported by accommodating two recording devices 500.

The articles of this modification are produced according to set standards, and the software maker or the game soft user mounts a recording device 500 in one of the recording device holding portions 310a while the other recording device holding portion 310b is made empty. When two recording devices 500 are used, the respective recording devices 500 may be mounted in the recording device holding portions 310a and 310b, respectively.

In the above-described embodiment, the fitting portion 316 is provided. However, the present invention may be applied to the structure having no fitting portion 316. Accordingly, in this case, the recording device 500 is held by the pressing of the projecting portions 311 to 314 against the side surface of the recording device.

Figure 10:
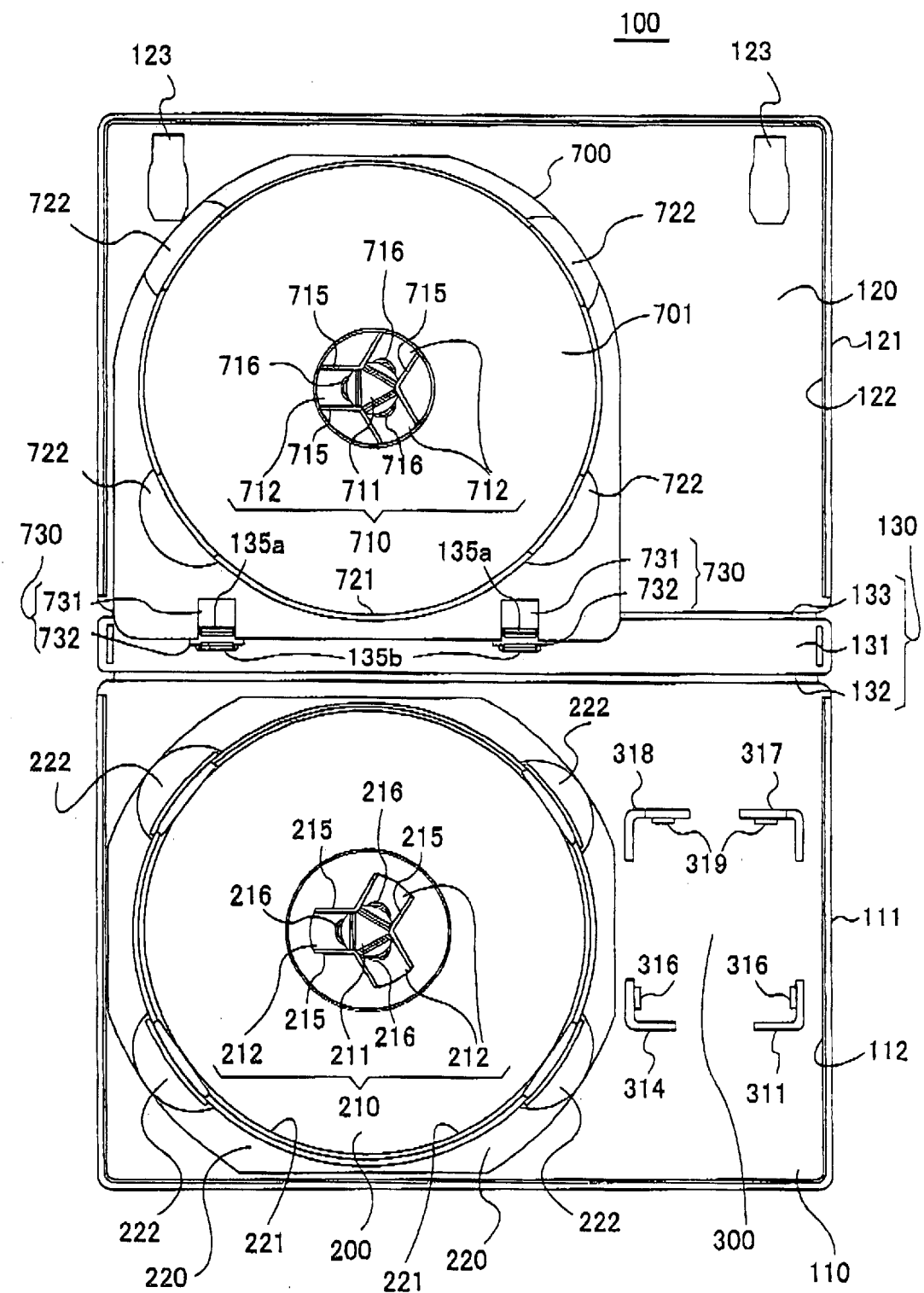
FIG. 10 is a plan view showing another example of the recording device holding portion of the recording medium holder according to the first embodiment of the present invention.
Figure 11:
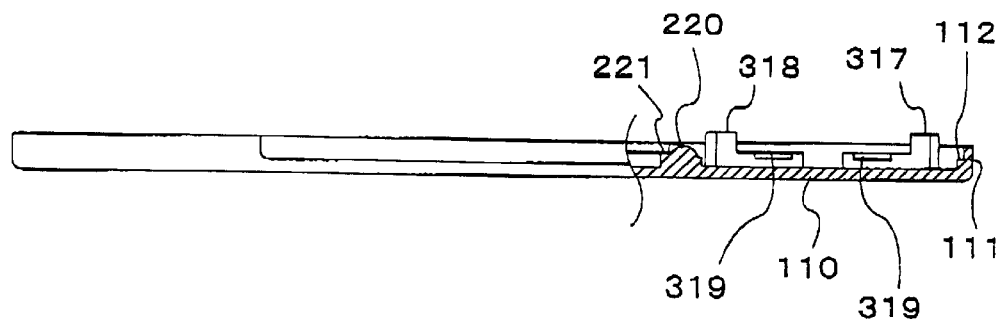
FIG. 11 is a front view showing the recording device holding portion shown in FIG. 10, which contains a partially cross-sectional view.

Next, another embodiment of the recording device holding portion of the recording medium holder will be described with reference to FIGS. 10 to 12.

In this embodiment, projecting portions 311, 312, 317 and 318 are provided to the second accommodating area 300 in which the recording device is held. Each of the projecting portions 311, 312, 317 and 318 is formed in L-shape, and it is located to be pressed against the corresponding one of corner portions of the recording device when the recording device to be held is mounted. Here, the projecting portions 311 and 312 are provided with fitting portions 316 on the surfaces confronting each other. Further, the projecting portions 317 and 318 are provided with fitting portions 319. Each fitting portion 316 has the same structure as the fitting portion 316 of the other embodiments described above. When the recording device 500 to be held is mounted, the fitting portions 319 are fitted to the connector portion of the recording device 500. Therefore, the fitting portions 319 are disposed so as to be lower in height than the fitting portions 316 (see FIG. 11).

Figure 12:
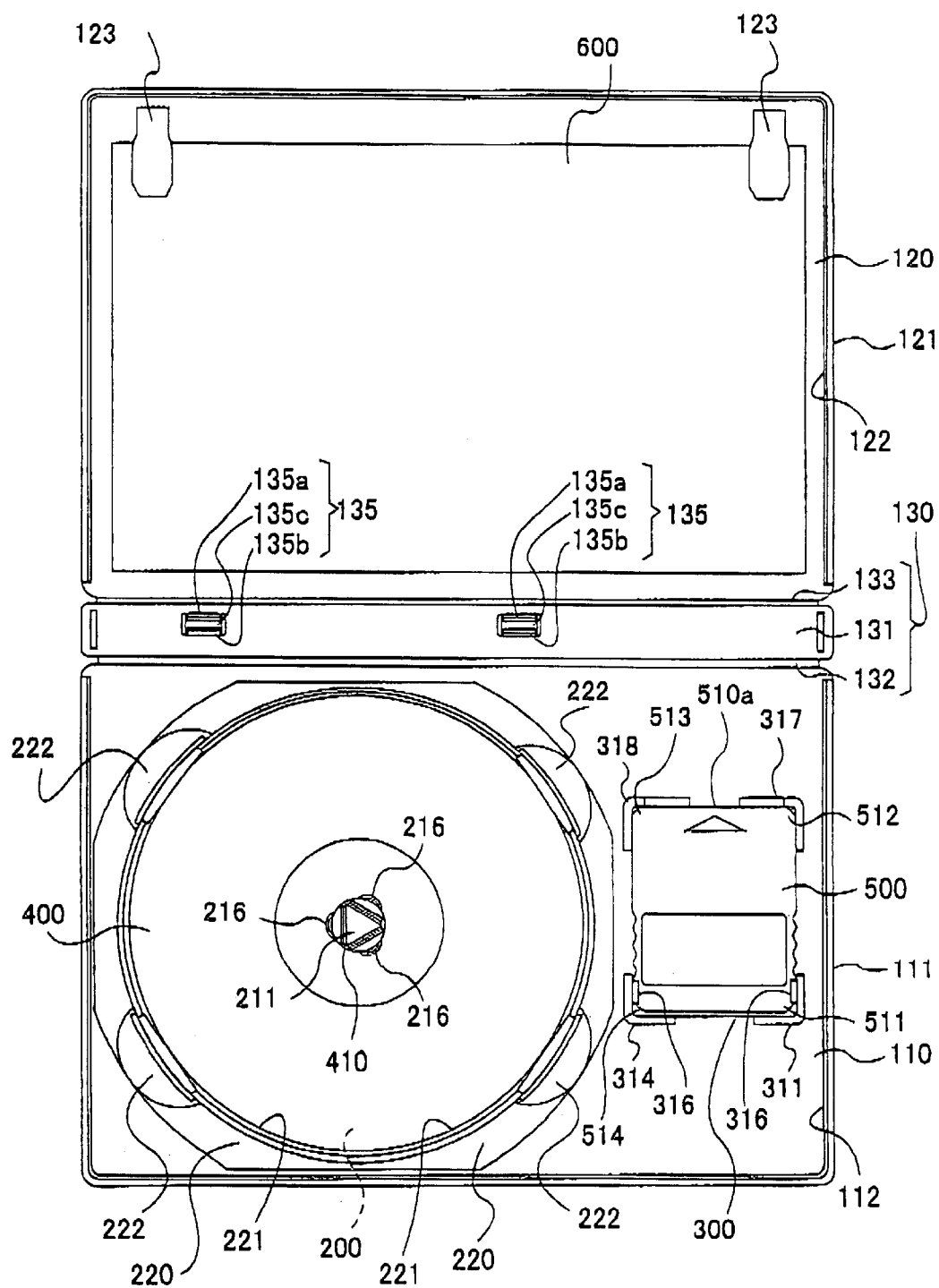
FIG. 12 is a plan view showing a state where the recording device is held in the recording device holding portion shown in FIG. 10.

FIG. 12 shows the state that the recording device 500 is mounted on the recording device holding portion.

As shown in FIG. 12, the recording device 500 is held while surrounded by the projecting portions 311, 312, 317 and 318. Further, the recording device 500 is more surely held by the fitting portions 316 and further the fitting portions 319 not shown in FIG. 12 (see FIG. 10) which are fitted to the connector portion 510a.

In each modification described above, each of the projecting portions may be inclined in the direction to hold in the recording device 500 or provided with a fitting portion.

The second accommodating area of the present invention is not limited to the above embodiment, and various modifications may be made. For example, in place of the projecting portions described above, pin-shaped projecting portions may be provided. Further, the second accommodating area may be constructed by a recess portion (not projecting portions). In this case, the recording device is held by the surface of the walls of the recess portion.

In the first and second embodiments described above, the first member 110 is provided with the first accommodating area 200 and the second accommodating area 300. However, the present invention is not limited to the above embodiment. For example, the second member 120 may be also provided with at least one of the first accommodating area 200 and the second accommodating area 300. Accordingly, when a recording medium can be also accommodated in the first accommodating area 200 provided to the second member 120, at least three recording media including the recording medium accommodated in the auxiliary accommodating member 700 can be accommodated and/or two or more recording devices can be accommodated.

Figure 18:
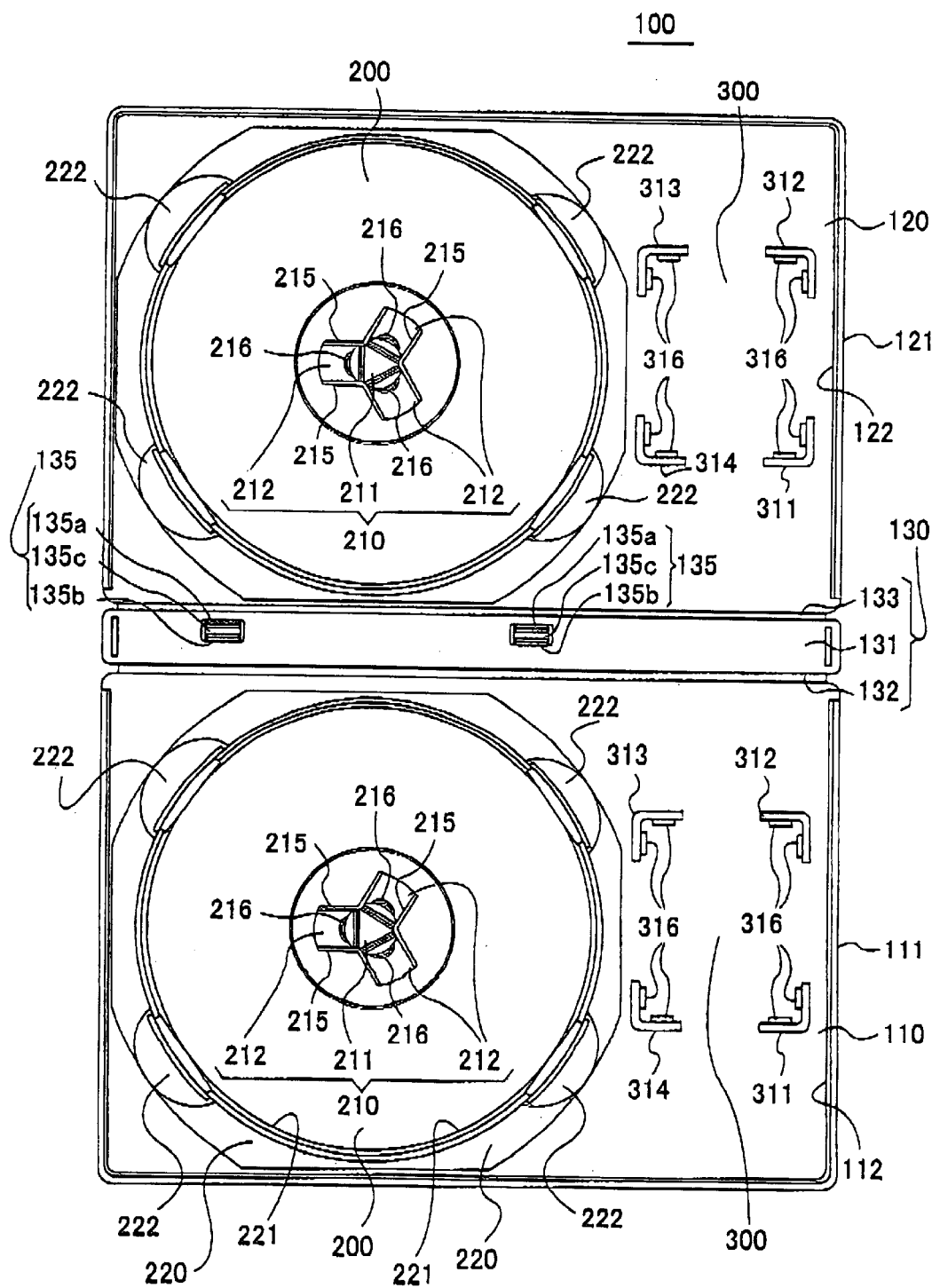
FIG. 18 is a plan view showing a state that first and second accommodating areas are provided to a second member.

FIG. 18 shows an embodiment of this case, and shows the state that the auxiliary accommodating member is detached. Under this state, two recording media can be accommodated, and two recording device can be accommodated. The first accommodating area 200 and the second accommodating area 300 which are provided to the first member 110 shown in FIG. 18 have the same structures and functions as the first accommodating area 200 and the second accommodating area 300 which are provided to the accommodating member 100 shown in FIG. 1. The first accommodating area 200 and the second accommodating area 300 provided to the second member 120 have the same structures and functions as the first accommodating area 200 and the second accommodating area 300 provided to the first member 110 except that only the base member for these areas is different. Further, the link member 130 has also the same structure and function.

The auxiliary accommodating member 700 can be freely detachably mounted fitted to the auxiliary accommodating member fitting portion 135 of the accommodating member 100 shown in FIG. 18.

Figure 19:
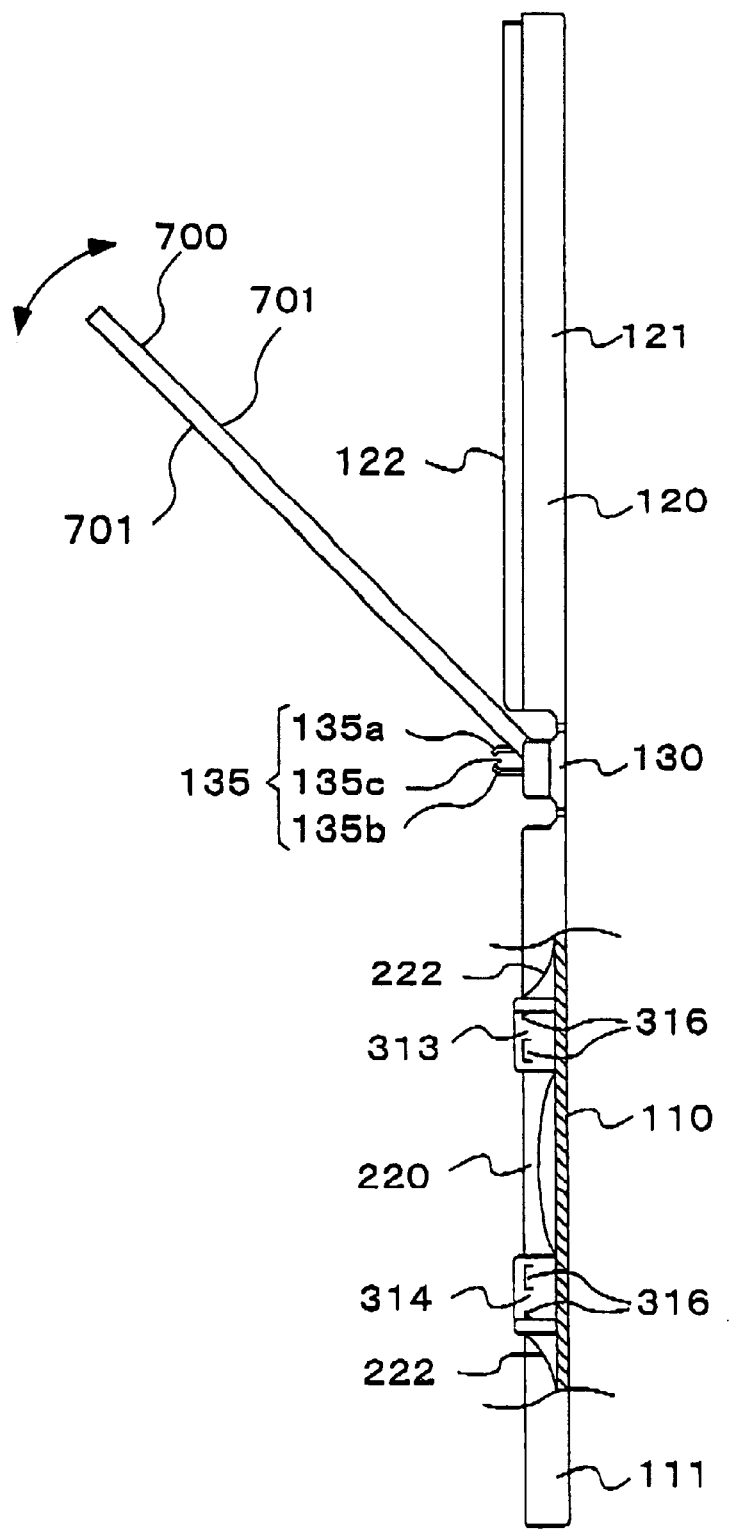
FIG. 19 is a side view showing a state that an auxiliary accommodating member having accomodating areas provided at both the sides thereof is linked to an auxiliary accommodating member fixing portion.

As shown in FIG. 7A, the accommodating area 701 is provided to one surface of the auxiliary accommodating member 700 used in each of the above-described embodiments. The auxiliary accommodating member 700 may be designed so that the accommodating area 701 may be provided on each of the surfaces of auxiliary accommodating member 700 (not shown). FIG. 19 shows the state that an auxiliary accommodating member 700 having accommodating areas 701 provided on both the surfaces thereof is linked to the auxiliary accommodating member fitting portion 135.

When such an auxiliary accommodating member 700 having the accommodating areas 701 on both the surfaces thereof is linked to the accommodating member 100 as shown in FIGS. 6 and 12, three disc type recording media can be accommodated. Further, when such an auxiliary accommodating member 700 is linked to the accommodating member 100 shown in FIG. 18, four disc type recording media can be accommodated.

In each of the above-described embodiments, one auxiliary accommodating member 700 is linked to the accommodating member 100. However, the present invention is not limited to this embodiment. For example, plural sets of auxiliary accommodating member fitting portions 135 may be provided to enable plural auxiliary accommodating members 700 to be mounted.

Further, each of the above-described embodiments may be constructed so that the auxiliary accommodating member 700 is fitted to the auxiliary accommodating member fitting portion 135 so that it is not overlapped with the second accommodating area 300. This structure keeps the auxiliary accommodating member 700 from obstructing the attachment/detachment of the recording device 500.

As described above, according to the above-described embodiments of the present invention, a recording medium in which software is recorded and a recording device in which data generated in connection with the software are recorded can be accommodated in one accommodating member. Accordingly, the user of the software can keep the recording medium having the software recorded therein and the recording device for recording the relevant data in association with each other. Further, the recording medium itself can be secured together with the software, not separately.

In terms of the software maker, a recording device which has been hitherto used as an accessory to an information processing apparatus such as a game apparatus and a recording medium in which software is recorded are accommodated in the same accommodating member in association with each other to fabricate an information providing body, and the information providing body thus fabricated can be supplied to the user of the software.

Further, according to the information providing body for the present invention, it can be relied upon that the above recording device actually exists, and thus the software maker can create more complicated software on the assumption that the data related to the software can be saved.

Still further, according to the information providing body for the present invention, the software maker may possibly record specific information in recording devices in advance and supply them to the users of the software.

Still further, if a recording medium in which a sequel to a game or the like is recorded is accommodated in an auxiliary accommodating member, it can be accommodated in a recording medium holder in which a previously-shipped recording medium is accommodated.

The recording device used in the above-described embodiments is used to record data related to a game. However, the present invention is not limited to this use.

Further, in the above-described embodiments, the recording device is used to record data which are created due to execution of some processing. However, the present invention is not limited to this use. For example, a compact computer having a memory, CPU and a display may be used as the recording device. In this case, the recording device may be used as a sub system. For example, it may be used as a compact game apparatus.

Accordingly, in the recording medium holder may be accommodated not only a recording medium in which software is recorded, but also a compact computer serving as a recording device in which data generated in association with the software is recorded and also the processing is executed on the basis of the data. Specifically, a recording device functioning as a compact device having a function of executing a game by using recorded data, for example, a mini game apparatus, a sub game apparatus or the like can be accommodated. Further, in the case of the information providing body for the present invention, an information providing body containing both the recording medium in which the software is recorded and the compact computer for executing the processing associated with the processing of the software can be fabricated.

In the above-described embodiments, one disc type recording medium is held in the first area. However, the present invention is not limited to this mode. It may be modified so that two or more disc type recording media can be held.

As described above, according to the information container of the present invention, any person can easily keep the information in the recording device regarding use of software or the like up to date, and easily store the device.

Further, according to the information providing body for the present invention, any person can easily perform preparation and maintenance of the recording device and keep the information in the recording device regarding use of software or the like up to date. In addition, the recording device can be supplied in association with the recording medium in which the information is recorded.

What is claimed is:

1. A recording medium holder for accommodating a recording medium in which information to be supplied to an information processing apparatus is recorded, including:

a first member and a second member between which a space for accommodating the recording medium and a recording device therein is formed under the state that the first and second members are confronted to each other; and a link member for linking said first and second members to each other so as to be folded so that said first and second members are confronted to each other, wherein said first member has a first accommodating area in which at least one recording medium to be held can be accommodated, said first member has a second accommodating area in which at least one recording device for recording data can be accommodated, said first accommodating area and said second accommodating area are both on an inner side of said first member and said inner side faces said second member under the state that the first and second members are confronted to each other, said link member has a fixing portion for fixing an auxiliary accommodating member in which at least one recording medium to be held can be accommodated, and said fixing portion is disposed so as to be fixed to said link member so that said auxiliary accommodating member is located between said first and second members.

2. The recording medium holder as claimed in claim 1, wherein said auxiliary accommodating member is freely detachably fitted to said fixing portion.

3. The recording medium holder as claimed in claim 1, wherein said auxiliary accommodating member thus fitted has an area for accommodating a disc type recording medium as said recording medium.

4. The recording medium holder as claimed in claim 3, wherein said second accommodating area has a space in which a recording device having a flat rectangular parallelepiped outer shape is accommodated, and said recording device to be accommodated has a connector portion at one end, in which a connector is disposed.

5. A recording medium holder for accommodating a recording medium in which information to be supplied to an information processing apparatus is recorded, including:

a first member and a second member between which a space for accommodating said recording medium and said recording device therein is formed under the state that said first and second members are confronted to each other;

a link member for linking said first and second members to each other so as to be folded so that said first and second members are confronted to each other; and an auxiliary accommodating member fixed to said first member, wherein said first member has a first accommodating area in which at least one recording medium to be held can be accommodated, said first member has a second accommodating area in which at least one recording device for recording data can be accommodated, said first accommodating area and said second accommodating area are both on an inner side of said first member and said inner side faces said second member under the state that the first and second members are confronted to each other, said auxiliary accommodating member has an area in which at least one recording medium to be held can be accommodated and is fixed to said link member while said auxiliary accommodating member is located between said first and second members.

6. The recording medium holder as claimed in claim 5, wherein said auxiliary accommodating member is detachably linked to said link member at one edge portion thereof.

7. The recording medium holder as claimed in claim 5, wherein each of said first accommodating area and said auxiliary accommodating member accommodates a disc type recording medium as said recording medium to be held, and has a size at which said disc type recording medium can be accommodated.

8. The recording medium holder as claimed in claim 7, wherein said auxiliary accommodating member is fitted to said link member so that it does not overlap with said second accommodating area.

9. The recording medium holder as claimed in claim 8, wherein said auxiliary accommodating member is detachably lined to said link member at one edge portion thereof.

10. The recording medium holder as claimed in claim 5, wherein said second accommodating area has a space in which a recording device having a flat rectangular parallelepiped outer shape is accommodated, and said recording device to be held has a connector portion at one end, in which a connector is disposed.

11. The recording medium holder as claimed in claim 10, wherein when said recording device to be held is put in said second accommodating area, said recording device holding portion has a holding mechanism which is brought into contact with the side surface of said recording device to hold said recording device, and said holding mechanism has a projecting portion which is brought into contact with a part of the side surface of said recording device to be held.

12. The recording medium holder as claimed in claim 11, wherein said projecting portion is formed in L-shape, and has a pawl portion which is disposed to abut against each corner portion of said recording device when said recording device to be held is put in, and fitted over the upper surface of said recording device when said recording device to be held is mounted.

13. The recording medium holder as claimed in claim 12, wherein said projecting portions are provided at plural locations around the place on which said recording device to be held is put, and one projecting portion has a fitting portion which is disposed so as to be adjacent to a corner portion of said recording device when said recording device to be held is put and is fitted to a connector portion of said recording device when said recording device to be held is mounted.

14. The recording medium holder as claimed in claim 10, wherein plural recording device holding portions are provided to said second accommodating area.

15. An information providing body for supplying information to an information processing apparatus including:

a recording medium in which information to be supplied to said information processing apparatus is recorded;

a recording device for recording data; and a recording medium holder for accommodating said recording medium and said recording device, wherein said recording medium holder comprises a first member and a second member between which a space for accommodating the recording medium and the recording device therein is formed under the state that the first and second members are confronted to each other; and a link member for linking said first and second members to each other so as to be folded so that said first and second members are confronted to each other, said first member has a first accommodating area in which at least one recording medium to be held can be accommodated, said first member has a second accommodating area in which at least one recording device for recording data can be accommodated, said first accommodating area and said second accommodating area are both on an inner side of said first member and said inner side faces said second member under the state that the first and second members are confronted to each other, said link member has a fixing portion for fixing an auxiliary accommodating member in which at least one recording medium to be held can be accommodated, and said fixing portion is disposed so as to be fixed to said link member so that said auxiliary accommodating member is located between said first and second members, said recording medium being accommodated in said first accommodating area.

16. The information providing body as claimed in claim 15, wherein said recording device is further accommodated in said second accommodating area.

17. The information providing body as claimed in claim 16, wherein said recording device to be accommodated contains a non-volatile memory.

18. The information providing body as claimed in claim 17, wherein said recording medium has game software recorded therein, and said recording device is mounted in a game apparatus and records therein data generated in connection with execution of a game.

19. The information providing body as claimed in claim 15, wherein said auxiliary accommodating member is detachably linked to said link member at one edge portion thereof.

20. The information providing body as claimed in claim 15, wherein each of said first accommodating area and said auxiliary accommodating member accommodates therein a disc type recording medium as a recording medium to be held, and has a size at which said disc type recording medium can be accommodated.

21. The information providing body as claimed in claim 20, wherein said auxiliary accommodating member is fitted to said link member so that it does not overlap with said second accommodating area.

22. The information providing body as claimed in claim 21, wherein said auxiliary accommodating member is detachably linked to said link member at one edge portion thereof.

23. The information providing body as claimed in 15, wherein said second accommodating area has a space in which a recording device having a flat rectangular parallelepiped outer shape is accommodated, and said recording device to be accommodated has a connector portion at one end, in which a connector is disposed.

24. The information providing body as claimed in claim 23, wherein a plurality of recording device holding portions are provided to said second accommodating area.

25. An information providing body for supplying information to be supplied to an information processing apparatus including:

a recording medium for recording information to be supplied to said information processing apparatus;

a recording device for recording data;

a recording medium holder for accommodating said recording medium and said recording device; and an auxiliary accommodating member fitted to said first member, wherein said recording medium holder comprises a first member and a second member between which a space for accommodating said recording medium and said recording device therein is formed under the state that said first and second members are confronted to each other; and a link member for linking said first and second members to each other so as to be folded so that said first and second members are confronted to each other, said first member has a first accommodating area in which at least one recording medium to be held can be accommodated, said first member has a second accommodating area in which at least one recording device for recording data can be accommodated, said first accommodating area and said second accommodating area are both on an inner side of said first member and said inner side faces said second member under the state that the first and second members are confronted to each other, said auxiliary accommodating member has an area in which at least one recording medium to be held can be accommodated and is fixed to said link member while said auxiliary accommodating member is located between said first and second members, and said recording medium is accommodated in at least one of said first accommodating area and an area of said auxiliary accommodating member which can accommodate said recording medium.

26. The information providing body as claimed in claim 25, wherein said recording device is further accommodated in said second accommodating area.

27. The information providing body as claimed in claim 25, wherein said recording medium is accommodated in each of said first accommodating area and said auxiliary accommodating member.

28. The information providing body as claimed in claim 25, wherein said recording device to be accommodated contains a non-volatile member.

29. The information providing body as claimed in claim 28, wherein said recording medium has game software recorded therein, and said recording device is mounted in a game apparatus and records data which are created in connection with execution of a game.

30. The information providing body as claimed in claim 25, wherein said auxiliary accommodating member is detachably linked to said link member at one edge portion thereof.

31. The information providing body as claimed in claim 25, wherein each of said first accommodating area and said auxiliary accommodating member accommodates a disc type recording medium as said recording medium to be held, and has a size at which said disc type recording medium can be accommodated.

32. The information providing body as claimed in claim 31, wherein said auxiliary accommodating member is fitted to said link member so that it does not overlap with said second accommodating area.

33. The information providing body as claimed in claim 32, wherein said auxiliary accommodating member is detachably linked to said link member at one edge portion thereof.

34. The information providing body as claimed in claim 25, wherein said second accommodating area has a space in which a recording device having a flat rectangular parallelepiped outer shape is accommodated, and said recording device to be accommodated has a connector portion at one end, where a connector is disposed.

35. The information providing body as claimed in claim 25, wherein a plurality of recording device holding portions are provided to said second accommodating area.

* * * * *